US012598577B2

(12) United States Patent
Lyazidi et al.

(10) Patent No.: US 12,598,577 B2
(45) Date of Patent: Apr. 7, 2026

(54) METHODS FOR SIGNALING POSITIONING MEASUREMENTS BETWEEN NODES

(71) Applicant: Telefonaktiebolaget LM Ericsson (publ), Stockholm (SE)

(72) Inventors: Yazid Lyazidi, London (GB); Gino Luca Masini, Stockholm (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 307 days.

(21) Appl. No.: 18/569,269

(22) PCT Filed: Jun. 28, 2022

(86) PCT No.: PCT/SE2022/050644
§ 371 (c)(1),
(2) Date: Dec. 12, 2023

(87) PCT Pub. No.: WO2023/022640
PCT Pub. Date: Feb. 23, 2023

(65) Prior Publication Data
US 2024/0284384 A1 Aug. 22, 2024

Related U.S. Application Data

(60) Provisional application No. 63/233,462, filed on Aug. 16, 2021.

(51) Int. Cl.
*H04W 64/00* (2009.01)
*G01S 5/00* (2006.01)
(Continued)

(52) U.S. Cl.
CPC .......... *H04W 64/00* (2013.01); *G01S 5/0081* (2013.01); *G01S 5/02213* (2020.05); *H04W 36/0033* (2013.01)

(58) Field of Classification Search
CPC . H04W 64/00; H04W 36/0033; H04W 76/27; H04W 36/02; G01S 5/0081; G01S 5/02213
See application file for complete search history.

(56) References Cited

U.S. PATENT DOCUMENTS

2020/0267631 A1 8/2020 Yilmaz et al.
2021/0051541 A1* 2/2021 Liu ............... H04W 36/008357
(Continued)

OTHER PUBLICATIONS

"(TP for POS BL CR for TS 38.455): Discussion on RRC inactive positioning", 3GPP TSG-RAN WG3 Meeting #113-e, R3-213620, E-meeting, Aug. 16-27, 2021, pp. 1-28.
(Continued)

*Primary Examiner* — Dhaval V Patel
(74) *Attorney, Agent, or Firm* — Murphy, Bilak & Homiller, PLLC

(57) ABSTRACT

Embodiments include methods for a second radio access network (RAN) node configured to support positioning of user equipment (UEs) in the RAN. Such methods include receiving, from a UE, a request to resume the UE's connection to the RAN that is currently suspended. The request includes a first indication that UE had an ongoing positioning procedure with a first RAN node before the UE's connection to the RAN was suspended, and/or a second indication that the UE reported positioning measurements to the first RAN node before the UE's connection was suspended. Such methods include retrieving, from the first RAN node, positioning measurements made by the first RAN node during the positioning procedure and continuing the positioning procedure for the UE while the UE is connected to the RAN via the second RAN node. Other embodiments include complementary methods for the UE, the first RAN node, and a positioning node.

20 Claims, 12 Drawing Sheets

(51) Int. Cl.
  *G01S 5/02* (2010.01)
  *H04W 36/00* (2009.01)

(56) References Cited

U.S. PATENT DOCUMENTS

| | | | | |
|---|---|---|---|---|
| 2022/0120842 A1* | 4/2022 | Edge | ..................... | H04W 64/00 |
| 2022/0232433 A1* | 7/2022 | Xu | ......................... | H04W 76/27 |
| 2023/0262648 A1* | 8/2023 | Thomas | ................ | H04W 64/00 |
| | | | | 455/456.1 |
| 2024/0073770 A1* | 2/2024 | Shah | ..................... | H04W 24/02 |
| 2024/0171340 A1* | 5/2024 | Vogedes | ................ | H04L 5/0048 |

OTHER PUBLICATIONS

"3GPP TS 38.305 V16.5.0", 3rd Generation Partnership Project; Technical Specification Group Radio Access Network; NG Radio Access Network (NG-RAN); Stage 2 functional specification of User Equipment (UE) positioning in NG-RAN (Release 16), Jun. 2021, pp. 1-120.

"3GPP TS 38.423 V16.6.0", 3rd Generation Partnership Project; Technical Specification Group Radio Access Network; NG-RAN; XN application protocol (XnAP) (Release 16), Jul. 2021, pp. 1-464.

"3GPP TS 38.455 V16.4.0", 3rd Generation Partnership Project; Technical Specification Group Radio Access Network; NG-RAN; NR Positioning Protocol A (NRPPa) (Release 16), Jul. 2021, pp. 1-151.

"3rd Generation Partnership Project; Technical Specification Group Services and System Aspects; System architecture for the 5G System (5GS); Stage 2 (Release 17)", 3GPP TS 23.501 V17.0.0, Mar. 2021, pp. 1-489.

"Addition of positioning measurements over XN", 3GPP TSG-RAN3 Meeting # 114-e, R3-215439, Nov. 1-11, 2021, pp. 1-3.

"Positioning of UEs in RRC Inactive State", 3GPP TSG-RAN WG2 Meeting #114-e, R2-2106083, Electronic, May 19-27, 2021, pp. 1-9.

"3GPP TS 38.300 V16.6.0", 3rd Generation Partnership Project; Technical Specification Group Radio Access Network; NR; NR and NG-RAN Overall Description; Stage 2 (Release 16), Jun. 2021, pp. 1-152.

"3GPP TS 23.273 V17.0.0", 3rd Generation Partnership Project; Technical Specification Group Services and System Aspects; 5G System (5GS) Location Services (LCS); Stage 2 (Release 17), Mar. 2021, pp. 1-99.

"3GPP TS 23.502 V17.1.0", 3rd Generation Partnership Project; Technical Specification Group Services and System Aspects; Procedures for the 5G System (5GS); Stage 2 (Release 17), Jun. 2021, pp. 1-692.

* cited by examiner

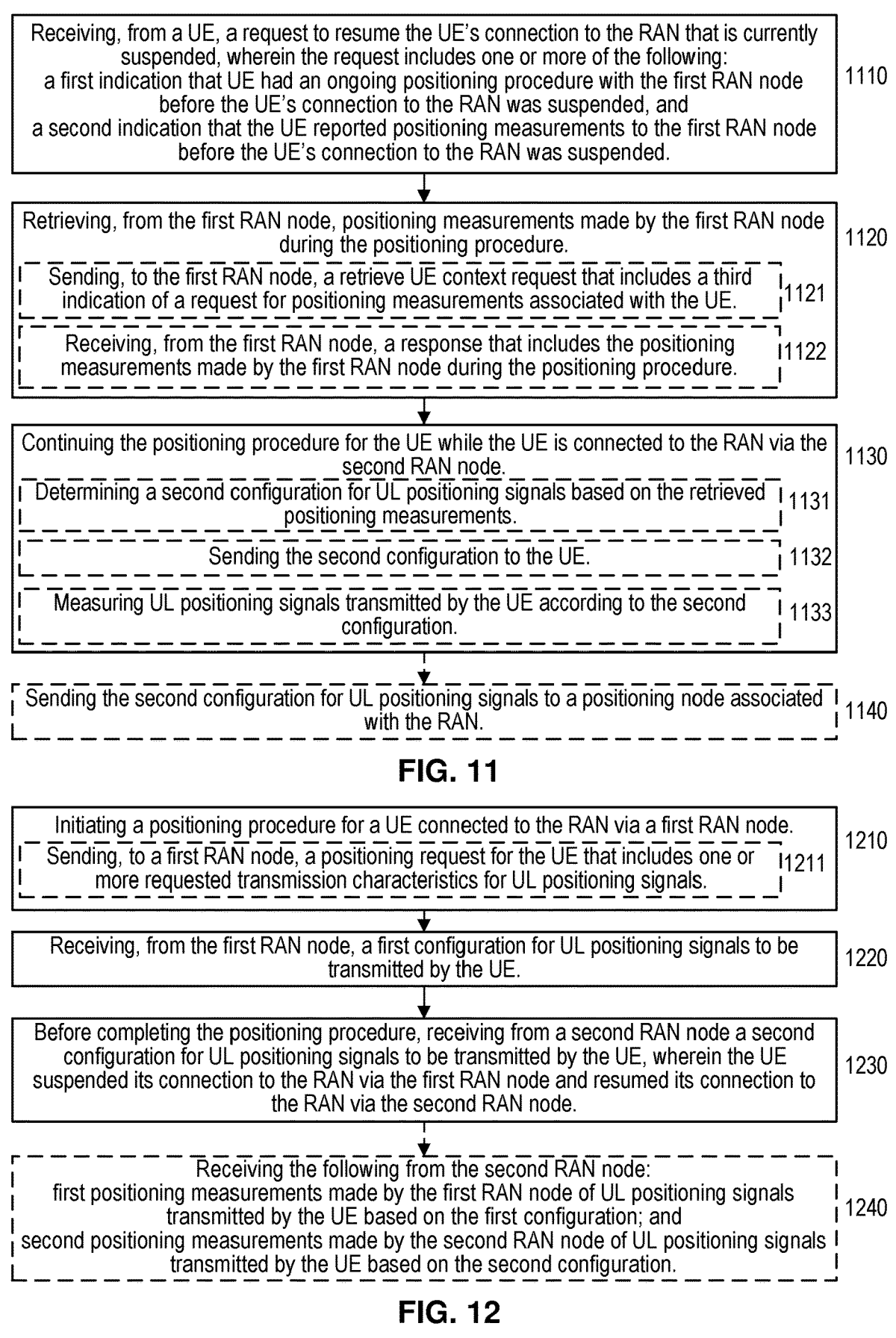

Receiving, from a UE, a request to resume the UE's connection to the RAN that is currently suspended, wherein the request includes one or more of the following: a first indication that UE had an ongoing positioning procedure with the first RAN node before the UE's connection to the RAN was suspended, and a second indication that the UE reported positioning measurements to the first RAN node before the UE's connection to the RAN was suspended. — 1110

Retrieving, from the first RAN node, positioning measurements made by the first RAN node during the positioning procedure. — 1120

Sending, to the first RAN node, a retrieve UE context request that includes a third indication of a request for positioning measurements associated with the UE. — 1121

Receiving, from the first RAN node, a response that includes the positioning measurements made by the first RAN node during the positioning procedure. — 1122

Continuing the positioning procedure for the UE while the UE is connected to the RAN via the second RAN node. — 1130

Determining a second configuration for UL positioning signals based on the retrieved positioning measurements. — 1131

Sending the second configuration to the UE. — 1132

Measuring UL positioning signals transmitted by the UE according to the second configuration. — 1133

Sending the second configuration for UL positioning signals to a positioning node associated with the RAN. — 1140

FIG. 11

Initiating a positioning procedure for a UE connected to the RAN via a first RAN node. — 1210

Sending, to a first RAN node, a positioning request for the UE that includes one or more requested transmission characteristics for UL positioning signals. — 1211

Receiving, from the first RAN node, a first configuration for UL positioning signals to be transmitted by the UE. — 1220

Before completing the positioning procedure, receiving from a second RAN node a second configuration for UL positioning signals to be transmitted by the UE, wherein the UE suspended its connection to the RAN via the first RAN node and resumed its connection to the RAN via the second RAN node. — 1230

Receiving the following from the second RAN node:
first positioning measurements made by the first RAN node of UL positioning signals transmitted by the UE based on the first configuration; and
second positioning measurements made by the second RAN node of UL positioning signals transmitted by the UE based on the second configuration. — 1240

FIG. 12

METHODS FOR SIGNALING POSITIONING MEASUREMENTS BETWEEN NODES

TECHNICAL FIELD

The present disclosure relates generally to wireless communication networks, and more specifically to signaling positioning measurements made by nodes of a wireless network for the purpose of determining the geographic location of a user equipment (UE).

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates an exemplary high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. With respect the NR interface to UEs, each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some scenarios, each gNB can be connected to all 5GC nodes within an "AMF Region," with the term AMF being discussed in more detail below.

The NG RAN logical nodes shown in FIG. 1 include a central (or centralized) unit (CU or gNB-CU) and one or more distributed (or decentralized) units (DU or gNB-DU). For example, gNB 100 includes gNB-CU 110 and gNB-DUs 120 and 130. CUs are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB. In other words, the F1 interface is not visible beyond gNB-CU.

5G/NR technology shares many similarities with fourth-generation (4G) Long-Term Evolution (LTE) technology. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than a fixed 15-kHz OFDM sub-carrier spacing (SCS) as in LTE, NR SCS can range from 15 to 240 kHz, with even greater SCS considered for future NR releases.

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE. In NR, for example, RS can include any of the following: synchronization signal/PBCH block (SSB), channel state information RS (CSI-RS), tertiary reference signals (or any other sync signal), positioning RS (PRS), demodulation RS (DMRS), phase-tracking reference signals (PTRS), etc. In general, SSB is available to all UEs regardless of the state of their connection with the network, while other RS (e.g., CSI-RS, DM-RS, PTRS) are associated with specific UEs that have a network connection.

3GPP standards provide various ways for positioning (e.g., determining the position of, locating, and/or determining the location of) UEs operating in NR networks. In general, a positioning node configures a target device (e.g., UE) and/or radio network nodes (RNN, e.g., gNB, ng-eNB, or RNN dedicated for positioning measurements) to perform one or more positioning measurements according to one or more positioning methods. For example, the positioning measurements can include timing (and/or timing difference) measurements on UE, network, and/or satellite transmissions. The positioning measurements are used by the target device, the measuring node, and/or the positioning node to determine the target device's location.

SUMMARY

However, there are various problems, issues, and/or difficulties related to obtaining the position of a UE that enters an inactive state (e.g., RRC_INACTIVE) while being served by a first network node (e.g., gNB or ng-eNB) and returns to a connected state (e.g., RRC_CONNECTED) in service of a second network node.

Embodiments of the present disclosure provide specific improvements to positioning of UEs in a wireless network, such as by providing, enabling, and/or facilitating solutions to overcome exemplary problems summarized above and described in more detail below.

Embodiments include methods (e.g., procedures) for a second radio access network (RAN) node configured to support positioning of UEs in the RAN.

These exemplary methods can include receiving, from a UE, a request to resume a suspended connection to the RAN. The request includes a first indication that UE had an ongoing positioning procedure with the first RAN node before the connection was suspended, and/or a second indication that the UE reported positioning measurements to the first RAN node before the connection was suspended. These exemplary methods can also include retrieving from the first RAN node positioning measurements made by the first RAN node during the positioning procedure. These exemplary methods can also include continuing the positioning procedure for the UE while the UE is connected to the RAN via the second RAN node.

In some embodiments, the positioning procedure is an UL-TDOA procedure. In some embodiments, the retrieved positioning measurements include positioning measurements made by multiple transmission reception points (TRPs) associated with the first RAN node.

In some embodiments, retrieving the positioning measurements can include the operations sending to the first RAN node a retrieve UE context request that includes a third indication of a request for positioning measurements associated with the UE, and receiving from the first RAN node a response that includes the positioning measurements made by the first RAN node during the positioning procedure. In some of these embodiments, the third indication is based on at least one of the first and second indications, e.g., one or more of these indications included in the request received from the UE.

In some of these embodiments, the response can be one of the following:

a retrieve UE context response message that includes the UE context;

a retrieve UE context failure message, i.e., that includes the positioning measurements but excludes the UE context; or a message other than the retrieve UE context response message or the retrieve UE context failure message.

In some of these embodiments, the response also includes a first configuration for UL positioning signals transmitted by the UE in relation to the positioning measurements.

In some embodiments, the retrieved positioning measurements can include one or more of the following:

receive-transmit (RxTx) time difference at the first RAN node; and one or more of the following measured by the first RAN node on the positioning signals transmitted by the UE according to the first configuration: reference signal received power (RSRP), angle of arrival (AoA), and relative time of arrival (RTOA).

In some embodiments, continuing the positioning procedure can include determining a second configuration for UL positioning signals (i.e., to be transmitted by the UE) based on the retrieved positioning measurements, sending the second configuration to the UE, and measuring UL positioning signals transmitted by the UE according to the second configuration.

In some of these embodiments, determining the second configuration can be further based on a first configuration for UL positioning signals transmitted by the UE in relation to the retrieved positioning measurements. The first configuration can be retrieved from the first RAN node in association with the positioning measurements. In some variants, the second configuration can include one or more of the following configuration elements that differ from corresponding configuration elements of the first configuration:

beam directions;

spatial relations between beams;

transmission periodicity;

transmission timing advance (TA);

transmission power;

reference signal (RS) resource sets; and resources per RS resource set.

In some of these embodiments, the exemplary method can also include sending the second configuration for UL positioning signals to a positioning node associated with the RAN.

Other embodiments include methods (e.g., procedures) for a UE configured for positioning in a RAN.

These exemplary methods can include initiating a positioning (e.g., UL-TDOA) procedure while connected to the RAN via a first RAN node. These exemplary methods can also include, before completing the positioning procedure, suspending the UE's connection to the RAN to an inactive state. These exemplary methods can also include sending, to a second RAN node, a request to resume the UE's connection to the RAN. The request includes a first indication that UE had an ongoing positioning procedure with the first RAN node before the UE's connection to the RAN was suspended, and/or a second indication that the UE reported positioning measurements to the first RAN node before the UE's connection to the RAN was suspended. These exemplary methods can also include continuing the positioning procedure while the UE is connected to the RAN via the second RAN node.

In some embodiments, initiating the positioning procedure can include receiving from the first RAN node a first configuration for UL positioning signals to be transmitted by the UE and transmitting UL positioning signals according to the first configuration. In some embodiments, continuing the positioning procedure can include receiving from the second RAN node a second configuration for UL positioning signals to be transmitted by the UE and transmitting UL positioning signals according to the second configuration.

In some embodiments, the second configuration includes one or more configuration elements that differ from corresponding configuration elements of the first configuration, such as summarized above for second RAN node embodiments.

Other embodiments include methods (e.g., procedures) for a first RAN node configured to support positioning of UEs in the RAN.

These exemplary methods can include initiating a positioning (e.g., UL-TDOA) procedure for a UE connected to the RAN via the first RAN node. These exemplary methods can also include, before completing the positioning procedure, receiving from a second RAN node a retrieve UE context request that includes a third indication of a request for positioning measurements associated with the UE. These exemplary methods can also include sending to the second RAN node a response that includes positioning measurements made by the first RAN node during the positioning procedure.

In some embodiments, initiating the positioning procedure can include sending the UE a first configuration for UL positioning signals to be transmitted by the UE and measuring UL positioning signals transmitted by the UE according to the first configuration. In some embodiments, initiating the positioning procedure can also include the following operations:

receiving, from a positioning node associated with the RAN, a positioning request for the UE that includes one or more requested transmission characteristics for UL positioning signals;

determining the first configuration for UL positioning signals based on the one or more requested transmission characteristics; and sending the first configuration for UL positioning signals to the positioning node in response to the positioning request.

In various embodiments, the response sent to the second RAN node can be one of the following:

a retrieve UE context response message that includes the UE context;

a retrieve UE context failure message, i.e., that includes the positioning measurements but excludes the UE context; or a message other than the retrieve UE context response message or the retrieve UE context failure message.

In various embodiments, the response sent to the second RAN node can also include a first configuration for UL positioning signals transmitted by the UE in relation to the positioning measurements included in the response. In some of these embodiments, the positioning measurements can include any of the measurements summarized above for second RAN node embodiments.

Other embodiments include methods (e.g., procedures) for a positioning node configured to operate with a RAN.

These exemplary methods can include initiating a positioning (e.g., UL TDOA) procedure for a UE connected to the RAN via a first RAN node. These exemplary methods can also include receive, from the first RAN node, a first configuration for UL positioning signals to be transmitted by the UE. These exemplary methods can also include, before completing the positioning procedure, receiving from a second RAN node a second configuration for UL positioning signals to be transmitted by the UE, which suspended its connection to the RAN via the first RAN node and resumed its connection to the RAN via the second RAN node.

In some embodiments, initiating the positioning procedure includes sending to a first RAN node a positioning request for the UE that includes one or more requested transmission characteristics for UL positioning signals. In such case, the first configuration is based on the one or more requested transmission characteristics.

In some embodiments, these exemplary methods can also include receiving the following from the second RAN node:

first positioning measurements made by the first RAN node of UL positioning signals transmitted by the UE based on the first configuration; and second positioning measurements made by the second RAN node of UL positioning signals transmitted by the UE based on the second configuration.

In some embodiments, the second configuration can include one or more configuration elements that differ from corresponding configuration elements of the first configuration (e.g., received in block 1220), such as summarized above for second RAN node embodiments.

Other embodiments include UEs (e.g., wireless devices, etc.), RAN nodes (e.g., base stations, eNBs, gNBs, ng-eNBs, TRPs, etc.), and positioning nodes (e.g., LMFs, E-SMLCs, SLPs, etc.) configured to perform operations corresponding to any of the exemplary methods described herein. Other embodiments include non-transitory, computer-readable media storing program instructions that, when executed by processing circuitry, configure such UEs, RAN nodes, or positioning nodes to perform operations corresponding to any of the exemplary methods described herein.

Embodiments described herein provide flexible and efficient techniques to for a second (or target) RAN node to be informed of existing positioning measurements performed by the first RAN node before the UE entered RRC_INACTIVE. This can save energy needed to perform such measurements and to configure the UE to support such measurements. This can also reduce positioning latency as well as network signaling traffic needed to configure the UE. Avoiding redundant measurements by the second RAN node can also reduce UE energy consumed in support of such redundant measurements (e.g., by reference signal transmission).

These and other objects, features, and advantages of embodiments of the present disclosure will become apparent upon reading the following Detailed Description in view of the Drawings briefly described below.

BRIEF DESCRIPTION OF THE DRAWINGS

FIG. 11 shows a flow diagram of an exemplary method (e.g., procedure) for a second RAN node (e.g., gNB, TRP, etc.), according to various embodiments of the present disclosure.

FIG. 12 shows a flow diagram of an exemplary method (e.g., procedure) for a positioning node (e.g., LMF, E-SMLC, SLP, etc.), according to various embodiments of the present disclosure.

DETAILED DESCRIPTION

Figure 1:
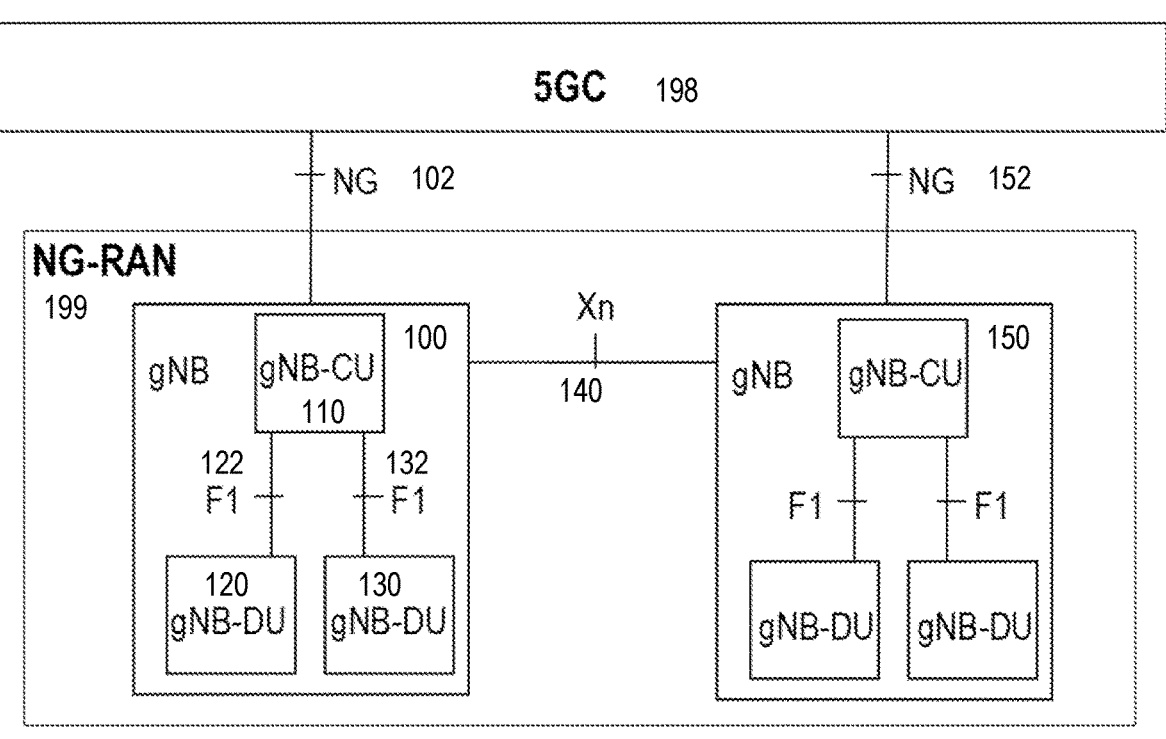
FIGS. 1-2 illustrate two high-level views of an exemplary 5G/NR network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point (TP), a transmission reception point (TRP), a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a PDN Gateway (P-GW), a Policy and Charging Rules Function (PCRF), an access and mobility management function (AMF), a session management function (SMF), a user plane function (UPF), a Charging Function (CHF), a Policy Control Function (PCF), an Authentication Server Function (AUSF), a location management function (LMF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VOIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Base station: As used herein, a "base station" may comprise a physical or a logical node transmitting or controlling the transmission of radio signals, e.g., eNB, gNB, ng-eNB, en-gNB, centralized unit (CU)/distributed unit (DU), transmitting radio network node, transmission point (TP), transmission reception point (TRP), remote radio head (RRH), remote radio unit (RRU), Distributed Antenna System (DAS), relay, etc.

Location server: As used herein, "location server" can refer to a network node with positioning functionality, e.g., ability to provide assistance data and/or request positioning measurements and/or calculate a location based on positioning measurements. A location server may or may not be part of a base station.

Positioning signals: As used herein, "positioning signals" may include any signal or channel to be received by the UE for performing a positioning measurement such as a DL reference signal, PRS, SSB, synchronization signal, DM-RS, CSI-RS, etc.

Positioning measurements: As used herein, "positioning measurements" may include timing measurements (e.g., time difference of arrival, TDOA, RSTD, time of arrival, TOA, Rx-Tx, RTT, etc.), power-based measurements (e.g., RSRP, RSRQ, SINR, etc.), identifier detection/measurement (e.g., cell ID, beam ID, etc.), and/or any other relevant measurements that are configured for a positioning method (e.g., OTDOA, E-CID, etc.). UE positioning measurements may be reported to a network node or may be used for positioning purposes by the UE.

Positioning beam: As used herein, a "positioning beam" can include any beam carrying at least one positioning signal and/or that is used for a positioning purpose such as for measurements supporting one or more positioning methods (e.g., OTDOA, AOA, etc.). A positioning beam can have its own explicit identity or can be identified through an index associated with a specific signal that the beam carries.

The above definitions are not meant to be exclusive. In other words, various ones of the above terms may be explained and/or described elsewhere in the present disclosure using the same or similar terminology. Nevertheless, to the extent that such other explanations and/or descriptions conflict with the above definitions, the above definitions should control.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

Figure 2:
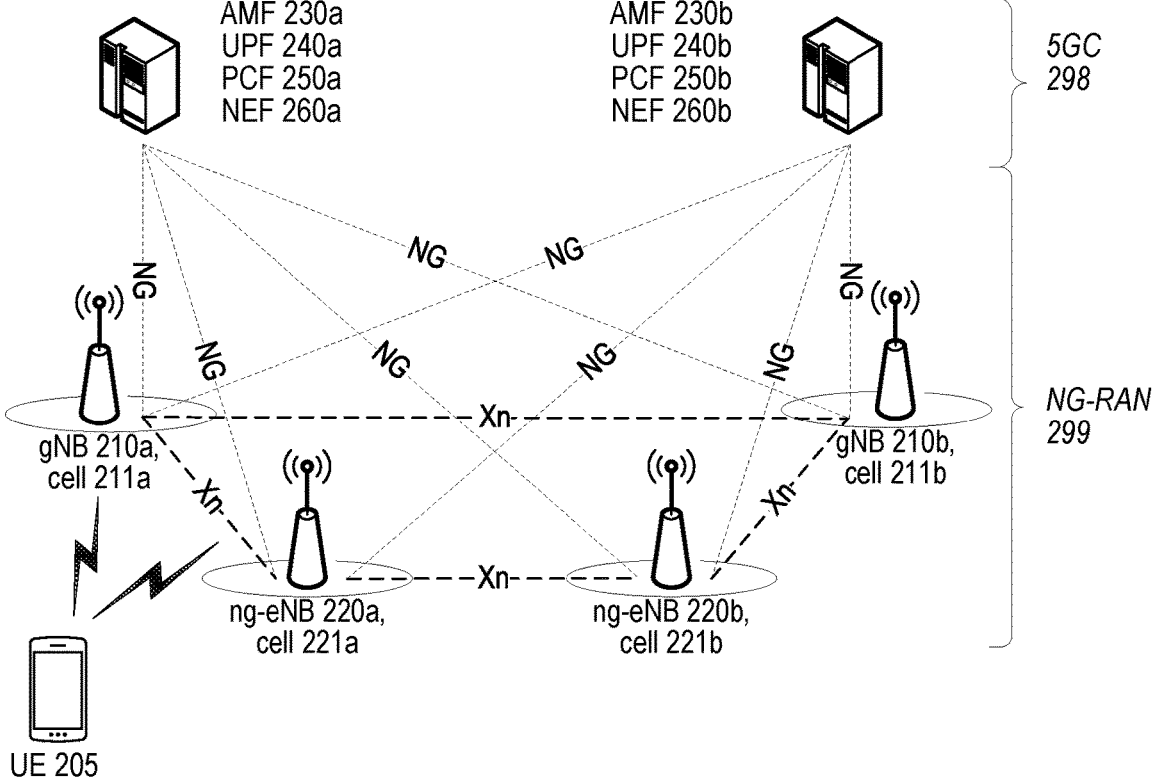

FIG. 2 shows another high-level view of an exemplary 5G network architecture, including a NG-RAN 299 and 5GC 298. NG-RAN 299 can include gNBs (e.g., 210a,b) and ng-eNBs (e.g., 220a,b) that are interconnected with each other via respective Xn interfaces. The gNBs and ng-eNBs are also connected via the NG interfaces to 5GC 298, more specifically to the Access and Mobility Management Functions (AMFs, e.g., 230a,b) via respective NG-C interfaces and to the User Plane Functions (UPFs, e.g., 240a,b) via respective NG-U interfaces. Moreover, the AMFs can communicate with one or more policy control functions (PCFs, e.g., 250a,b) and network exposure functions (NEFs, e.g., NEFs 260a,b).

Each of the gNBs 210 can support the NR radio interface including frequency division duplexing (FDD), time division duplexing (TDD), or a combination thereof. Each of ng-eNBs 220 can support the fourth-generation (4G) Long-Term Evolution (LTE) radio interface. Unlike conventional LTE eNBs, however, ng-eNBs 220 connect to the 5GC via the NG interface. Each of the gNBs and ng-eNBs can serve a geographic coverage area including one more cells, such as cells 211a-b and 221a-b shown in FIG. 2. Depending on the particular cell in which it is located, a UE 205 can communicate with the gNB or ng-eNB serving that particular cell via the NR or LTE radio interface, respectively. Although FIG. 2 shows gNBs and ng-eNBs separately, it is also possible that a single NG-RAN node provides both types of functionality.

Figure 3:
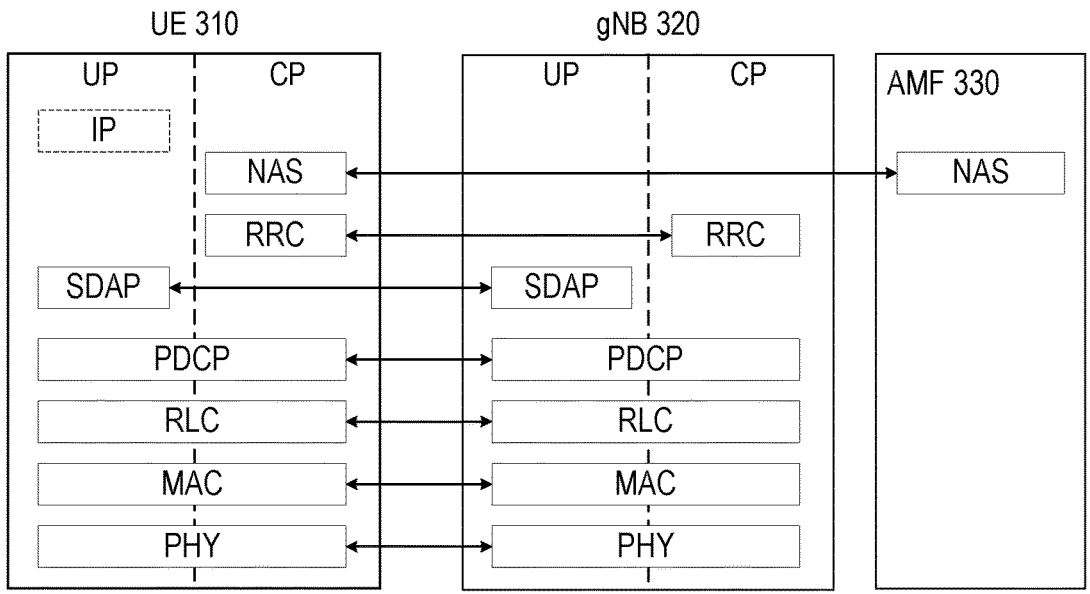
FIG. 3 shows an exemplary configuration of NR user plane (UP) and control plane (CP) protocol stacks.

Positioning-related information, such as assistance data and positioning measurements, can be communicated between network and UE via user plane (UP) and control plane (CP). FIG. 3 shows an exemplary configuration of NR UP and CP protocol layers between a UE (310), a gNB (320), and an AMF (330), such as those shown in FIGS. 1-2. The Physical (PHY), Medium Access Control (MAC), Radio Link Control (RLC), and Packet Data Convergence Protocol (PDCP) layers between the UE and the gNB are common to UP and CP. The PDCP layer provides ciphering/deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. The Service Data Adaptation Protocol (SDAP) layer handles quality-of-service (QOS) including mapping between QoS flows and Data Radio Bearers (DRBs) and marking QoS flow identifiers (QFI) in UL and DL packets. The RLC layer transfers PDCP PDUs to the MAC through logical channels (LCH). RLC provides error detection/correction, concatenation, segmentation/reassembly, sequence numbering, reordering of data transferred to/from the upper layers. The MAC layer provides mapping between LCHs and PHY transport channels, LCH prioritization, multiplexing into or demultiplexing from transport blocks (TBs), hybrid ARQ (HARQ) error correction, and dynamic scheduling (on gNB side). The PHY layer provides transport channel services to the MAC layer and handles transfer over the NR radio interface, e.g., via modulation, coding, antenna mapping, and beam forming.

On CP side, the non-access stratum (NAS) layer is between UE and AMF and handles UE/gNB authentication, mobility management, and security control. The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) and used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the UE is camping. However, NR RRC includes an RRC_INACTIVE state in which a UE is known (e.g., via UE context) by the serving gNB. RRC_INACTIVE has some properties like a "suspended" condition used in LTE.

Three important functional elements of the 3GPP positioning architecture are LCS Client, LCS target, and LCS Server. The LCS Server is a physical or logical entity (e.g., a location server) that manages positioning for an LCS target (e.g., a UE) by collecting measurements and other location information, assisting the LCS target in measurements when necessary, and estimating the LCS target location. An LCS Client is a software and/or hardware entity that interacts with an LCS Server for the purpose of obtaining location information for one or more LCS targets (i.e., the entities being positioned) such as a UE. LCS Clients may also reside in the LCS targets themselves. An LCS Client sends a request to an LCS Server to obtain location information, and the LCS Server processes and serves the received requests and sends the positioning result and optionally a velocity estimate to the LCS Client. A positioning request can be originated from the terminal or a network node or external client. Position calculation can be conducted, for example, by the LCS Server (e.g., E-SMLC or SLP) or by the LCS target (e.g., a UE).

Additionally, the following positioning methods are supported in NR:

Enhanced Cell ID (E-CID). Utilizes information to associate the UE with the geographical area of a serving cell, and then additional information to determine a finer granularity position. The following measurements are supported for E-CID: AoA (base station only), UE Rx-Tx time difference, timing advance (TA) types 1 and 2, reference signal received power (RSRP), and reference signal received quality (RSRQ).

Assisted GNSS. GNSS information retrieved by the UE, supported by assistance information provided to the UE from the E-SMLC.

OTDOA (Observed Time Difference of Arrival). The UE receives and measures Global Navigation Satellite System (GNSS) signals, supported by assistance information provided to the UE from E-SMLC.

UTDOA (Uplink TDOA). The UE is requested to transmit a specific waveform that is detected by multiple location measurement units (LMUs, which may be standalone, co-located or integrated into an eNB) at known positions. These measurements are forwarded to the E-SMLC for multilateration.

Multi-RTT: The device (e.g., UE) computes UE Rx-Tx time difference and gNBs compute gNB Rx-Tx time difference. The results are combined to find the UE position based upon round trip time (RTT) calculation.

DL angle of departure (DL-AoD): gNB or LMF calculates the UE angular position based upon UE DL RSRP measurement results (e.g., of PRS transmitted by network nodes).

UL angle of arrival (UL-AoA): gNB calculates the UL AoA based upon measurements of a UE's UL SRS transmissions.

In addition, one or more of the following positioning modes can be utilized in each of the positioning methods listed above:

UE-Assisted: The UE performs measurements with or without assistance from the network and sends these measurements to the E-SMLC where the position calculation may take place.

UE-Based: The UE performs measurements and calculates its own position with assistance from the network.

Standalone: The UE performs measurements and calculates its own position without network assistance.

The detailed assistance data may include information about network node locations, beam directions, etc. The assistance data can be provided to the UE via unicast or via broadcast.

Figure 4:
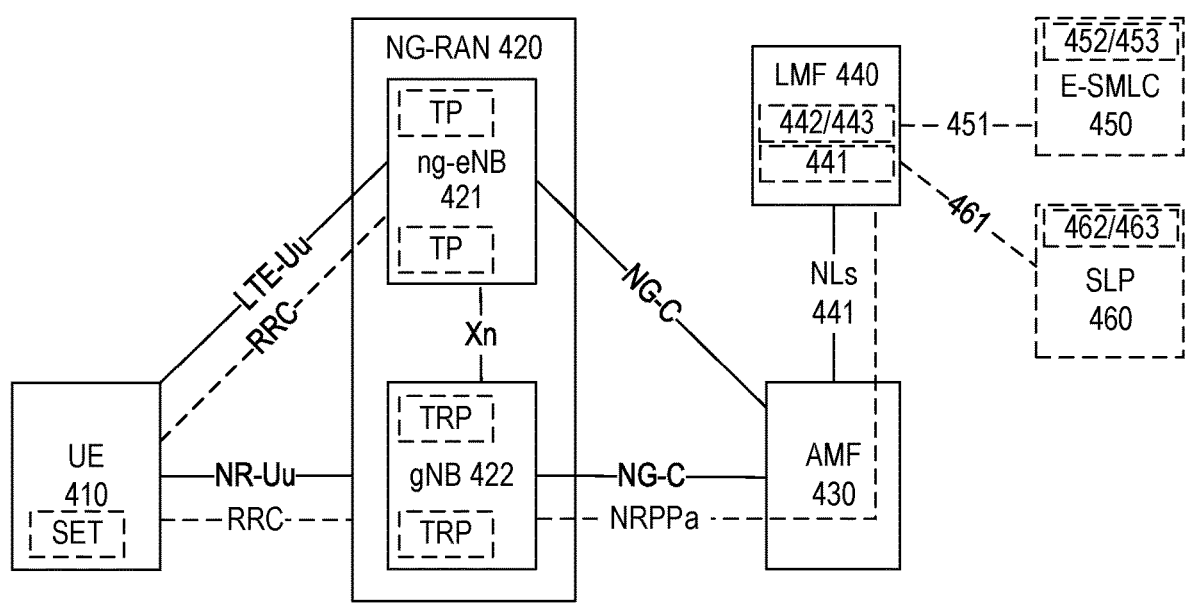
FIG. 4 is a block diagram illustrating a high-level architecture for UE positioning in NR networks.

FIG. 4 is a block diagram illustrating a high-level architecture for supporting UE positioning in NR networks. NG-RAN 420 can include nodes such as gNB 422 and ng-eNB 421, similar to the architecture shown in FIG. 2. Each ng-eNB may control several transmission points (TPs), such as remote radio heads. Similarly, each gNB may control several TRPs. Some or all of the TPs/TRPs may be DL-PRS-only for support of PRS-based TBS.

In addition, the NG-RAN nodes communicate with an AMF 430 in the 5GC via respective NG-C interfaces (both of which may or may not be present), while AMF 430 communicates with a location management function (LMF) 440 communicate via an NLs interface 441. An LMF supports various functions related to determination of UE locations, including location determination for a UE and obtaining DL location measurements or a location estimate from the UE, UL location measurements from the NG RAN, and non-UE associated assistance data from the NG RAN.

In addition, positioning-related communication between UE 410 and the NG-RAN nodes occurs via the RRC protocol, while positioning-related communication between NG-RAN nodes and LMF occurs via an NRPPa protocol. Optionally, the LMF can also communicate with an enhanced serving mobile location center (E-SMLC) 450 and a secure UP location (SUPL) location platform (SLP) 460 via communication interfaces 451 and 461, respectively. Communication interfaces 451 and 461 can utilize and/or be based on standardized protocols, proprietary protocols, or a combination thereof. E-SMLC 450 is responsible for UE positioning via LTE CP while SLP 460 is responsible for UE positioning via UP.

LMF 440 can also include, or be associated with, various processing circuitry 442, by which the LMF performs various operations described herein. Processing circuitry 442 can include similar types of processing circuitry as described herein in relation to other network nodes (see, e.g., descriptions of FIGS. 14 and 16). LMF 440 can also include, or be associated with, a non-transitory computer-readable medium 443 storing instructions (also referred to as a computer program program) that can facilitate the operations of processing circuitry 442. Medium 443 can include similar types of computer memory as described herein in relation to other network nodes (see, e.g., descriptions of FIGS. 14 and 16). Additionally, LMF 440 can include various communication interface circuitry 441 (e.g., Ethernet, optical, and/or radio transceivers) that can be used, e.g., for communication via the NLs interface. For example, communication interface circuitry 441 can be similar to other interface circuitry described herein in relation to other network nodes (see, e.g., descriptions of FIGS. 14 and 16).

Similarly, E-SMLC 450 can also include, or be associated with, various processing circuitry 452, by which the E-SMLC performs various operations described herein. Processing circuitry 452 can include similar types of processing circuitry as described herein in relation to other network nodes (see, e.g., descriptions of FIGS. 14 and 16). E-SMLC 450 can also include, or be associated with, a non-transitory computer-readable medium 453 storing instructions (also referred to as a computer program program) that can facilitate the operations of processing circuitry 452. Medium 453 can include similar types of computer memory as described herein in relation to other network nodes (see, e.g., descriptions of FIGS. 14 and 16). E-SMLC 450 can also have communication interface circuitry that is appropriate for communicating via interface 451, which can be similar to other interface circuitry described herein in relation to other network nodes (see, e.g., descriptions of FIGS. 14 and 16).

Similarly, SLP 460 can also include, or be associated with, various processing circuitry 462, by which the SLP performs various operations described herein. Processing circuitry 662 can include similar types of processing circuitry as described herein in relation to other network nodes (see, e.g., descriptions of FIGS. 14 and 16). SLP 460 can also include, or be associated with, a non-transitory computer-readable medium 463 storing instructions (also referred to as a computer program program) that can facilitate the operations of processing circuitry 462. Medium 463 can include similar types of computer memory as described herein in relation to other network nodes (see, e.g., descriptions of FIGS. 14 and 16). SLP 460 can also have communication interface circuitry that is appropriate for communicating via interface 461, which can be similar to other interface circuitry described herein in relation to other network nodes (see, e.g., descriptions of FIGS. 14 and 16).

In typical operation, the AMF can receive a request for a location service associated with a particular target UE from another entity (e.g., a gateway mobile location center (GMLC)), or the AMF itself can initiate some location service on behalf of a particular target UE (e.g., for an emergency call from the UE). The AMF then sends a location services (LS) request to the LMF. The LMF processes the LS request, which may include transferring assistance data to the target UE to assist with UE-based and/or UE-assisted positioning; and/or positioning of the target UE. The LMF then returns the result of the LS (e.g., a position estimate for the UE and/or an indication of any assistance data transferred to the UE) to the AMF or to another entity (e.g., GMLC) that requested the LS.

Various interfaces and protocols are used for, or involved in, NR positioning. The LTE Positioning Protocol (LPP) is used between a target device (e.g., UE in the control-plane, or SET in the user-plane) and a positioning server (e.g., LMF in the control-plane, SLP in the user-plane). LPP can use either CP or UP protocols as underlying transport. NRPP is terminated between a target device and the LMF. RRC protocol is used between UE and gNB (via NR radio interface) and between UE and ng-eNB (via LTE radio interface).

Furthermore, the NR Positioning Protocol A (NRPPa) carries information between the NG-RAN Node and the LMF and is transparent to the AMF. As such, the AMF routes the NRPPa PDUs transparently (e.g., without knowledge of the involved NRPPa transaction) over NG-C interface based on a Routing ID corresponding to the involved LMF. More specifically, the AMF carries the NRPPa PDUs over NG-C interface either in UE associated mode or non-UE associated mode. The NGAP protocol between the AMF and an NG-RAN node (e.g., gNB or ng-eNB) is used as transport for LPP and NRPPa messages over the NG-C interface. NGAP is also used to instigate and terminate NG-RAN-related positioning procedures.

LPP/NRPP are used to deliver messages such as positioning capability request, OTDOA positioning measurements request, and OTDOA assistance data to the UE from a positioning node (e.g., location server). LPP/NRPP are also used to deliver messages from the UE to the positioning node including, e.g., UE capability, UE measurements for UE-assisted OTDOA positioning, UE request for additional assistance data, UE configuration parameter(s) to be used to create UE-specific OTDOA assistance data, etc. NRPPa is used to deliver the information between ng-eNB/gNB and LMF in both directions. This can include LMF requesting some information from ng-eNB/gNB, and ng-eNB/gNB providing some information to LMF. For example, this can include information about PRS transmitted by ng-eNB/gNB that are to be used for OTDOA positioning measurements by the UE.

Figure 5:
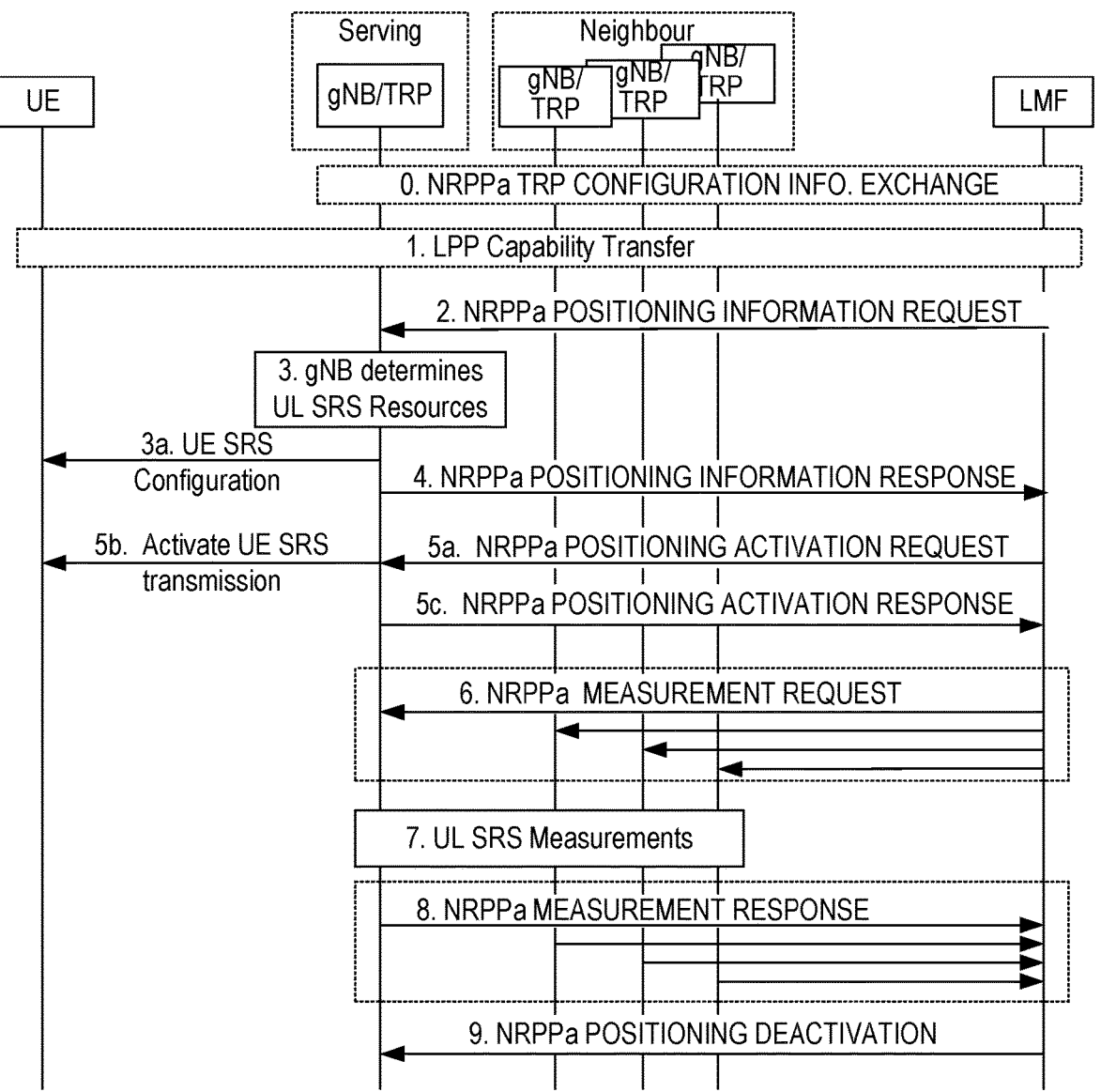
FIG. 5 shows a signal flow diagram for an exemplary uplink time difference of arrival (UL-TDOA) positioning procedure.

FIG. 5 shows a signal flow diagram for an exemplary UL-TDOA positioning procedure between a UE, a serving gNB/TRP, a plurality of neighbor gNBs/TRPs, and an LMF. Further details are provided in 3GPP TS 38.305 (v16.5.0) section 8.13.3.4, the entirety of which is incorporated herein by reference. In this procedure, the serving gNB/TRP and the neighbor gNBs/TRPs measures UL-SRS transmitted by the UE (operation 7) and provide these measurements to the LMF (operation 8) for UE position determination.

In the Positioning Information Request message sent in operation 2, the LMF can provide Requested SRS Transmission Characteristics to the serving gNB, which can use this information to determine UL SRS resources (operation 3) used to configure the UE (operation 3*a*). Table 1 below provides an exemplary structure of a Requested SRS Transmission Characteristics IE.

TABLE 1

| IE/Group Name | Presence | Range | IE Type/Ref. | Semantics Description |
|---|---|---|---|---|
| Number Of Periodic Transmissions | C-ifResource TypePeriodic | | INTEGER (0 . . . 500, . . . ) | The number of periodic SRS transmissions requested. The value of 'O' represents an infinite number of periodic SRS transmissions. |
| Resource Type | M | | ENUMERATED (periodic, semi-persistent, aperiodic, . . . ) | |
| CHOICE Bandwidth | M | | | |
| >FR1 | | | ENUMERATED (5 mHz, 10 mHz, 20 mHz, 40 mHz, 50 mHz, 80 mHz, 100 mHz, . . . ) | |
| >FR2 | | | ENUMERATED (50 mHz, 100 mHz, 200 mHz, 400 mHz, . . . ) | |
| SRS Resource Set List | | 0 . . . 1 | | |
| >SRS Resource Set Item | | 1 . . . < maxnoSRS-ResourceSets> | | |
| >>Number of SRS Resources Per Set | O | | INTEGER (1 . . . 16, . . . ) | The number of SRS Resources per resource set for SRS transmission. |
| >>Periodicity List | | 0 . . . 1 | | |
| >>>Periodicity List Item | | 1 . . . < maxnoSRS-ResourcePerSet | | |
| >>>>PeriodicitySRS | M | | ENUMERATED (0.125, 0.25, 0.5, 0.625, 1, 1.25, 2, 2.5, 4, 5, 8, 10, 16, 20, 32, 40, 64, 80, 160, 320, 640, 1280, 2560, 5120, 10240, . . . ) | Milli-seconds |

TABLE 1-continued

| IE/Group Name | Presence | Range | IE Type/Ref. | Semantics Description |
|---|---|---|---|---|
| >>Spatial Relation Information | O | | 9.2.34 | |
| >>Pathloss Reference Information | O | | 9.2.53 | |
| SSB Information | O | | 9.2.54 | |
| SRS Frequency | O | | INTEGER (0 . . . 3279165) | NR ARFCN The carrier frequency of SRS transmission bandwidth. |

The following provides additional information about the fields in Table 1 above.

"ifResourceTypePeriodic" is present if the Resource Type IE is set to the value "Periodic".

The constant "maxnoSRS-ResourceSets" is a maximum number of SRS Resource Sets that can be requested for SRS transmission, and has a value of 16.

The constant "maxnoSRS-ResourcePerSet" is a maximum number of SRS Resources per resource set, and has a value of 16.

As briefly mentioned above, NR RRC includes an RRC_INACTIVE state in which a UE is known (e.g., via UE context) by the serving gNB. More specifically, an RRC_INACTIVE UE remains in CM-CONNECTED and can move within a RAN Notification Area (RAN) configured by NG-RAN without notifying the NG-RAN of changes in serving gNBs within the RNA. In RRC_INACTIVE, the last serving gNB node keeps the UE context and the UE-associated NG connection with the UE's serving AMF and UPF.

If the last serving gNB receives DL data for the UE from the UPF while the UE is in RRC_INACTIVE, it pages in the cells corresponding to the RNA and may send XnAP RAN Paging to neighbor gNB(s) if the RNA includes cells of neighbor gNB(s). The same paging takes place when the last serving gNB receives DL UE-associated signaling from the AMF, except a UE Context Release Command message. Upon receiving such a UE Context Release Command message for an RRC_INACTIVE UE, the last serving gNB may page in the cells corresponding to the RNA and may send XnAP RAN Paging to neighbor gNB(s) if the RNA includes cells of neighbor gNB(s), in order to release UE explicitly.

Figure 6:
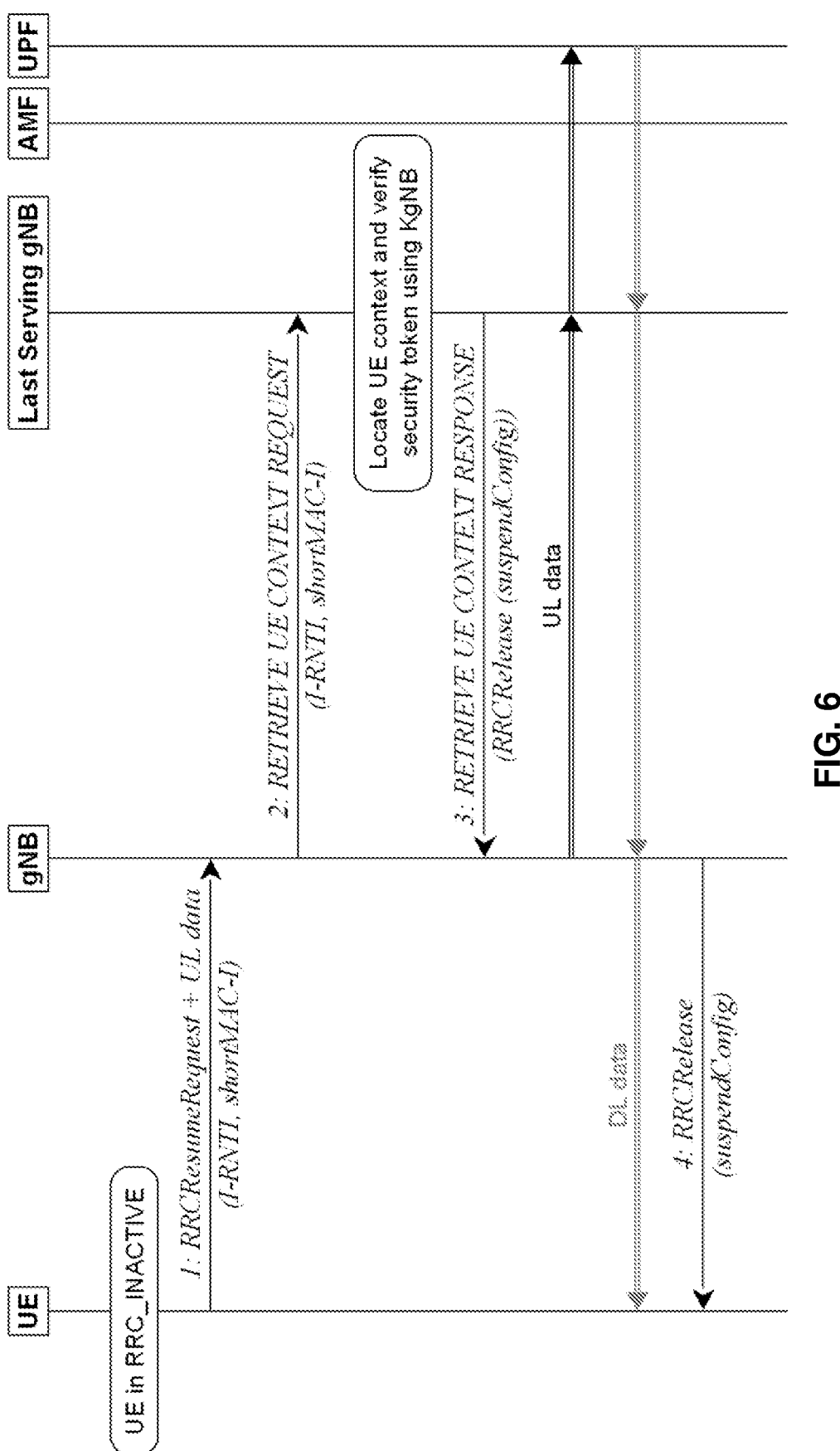
FIG. 6 shows a signal flow diagram of a scenario in which an RRC_INACTIVE UE attempts to resume a connection in a cell served by a target gNB other than the last serving gNB.

FIG. 6 shows a signal flow diagram of a scenario in which an RRC_INACTIVE UE attempts to resume (i.e., enter RRC_CONNECTED) in a cell served by a target gNB other than the UE's last serving gNB. In this scenario, the target gNB triggers the XnAP Retrieve UE Context procedure to obtain the UE context from the last serving gNB. The target gNB may also trigger an Xn-U Address Indication procedure including tunnel information for potential recovery of data from the last serving gNB. Upon successful UE context retrieval (operation 3), the target gNB performs slice-aware admission control (if slice information was received), becomes the UE's serving gNB, and triggers an NGAP Path Switch Request and applicable RRC procedures. After the path switch procedure, the serving gNB triggers release of the UE context by the previous serving gNB, e.g., via a XnAP UE Context Release procedure. Further details about the UE context retrieval procedure illustrated in FIG. 6 can be found in 3GPP TS 38.300 (v16.6.0).

An RRC_INACTIVE UE is required to initiate RNA update when it moves out of the configured RNA. When receiving an RNA update request from a UE, the receiving gNB triggers an XnAP Retrieve UE Context procedure to get the UE context from the last serving gNB. The receiving gNB may decide to send the UE back to RRC_INACTIVE state, move the UE into RRC_CONNECTED state, or send the UE to RRC_IDLE. In case of periodic RNA update, if the last serving gNB decides not to relocate the UE context, it fails the Retrieve UE Context procedure.

There can be some problems related to LMF awareness of a UE moving from a last serving gNB, which can hinder the LMF from performing positioning procedures associated with the UE. For example, it is unclear how an LMF can handle a UE-associated NRPPa message request when an RRC_INACTIVE UE has reselected to a new gNB within the same RNA. As another example, it is unclear how the LMF can handle an RRC_INACTIVE UE reselecting to a new gNB—with or outside of the RNA—when UE has already been configured with SRS transmissions by the last serving gNB (e.g., as in FIG. 5).

In some cases, an RRC_INACTIVE UE may move not only between RNAs within a serving RAN but between serving RANs, e.g., from a serving NG-RAN (S-NG-RAN) to a target NG-RAN (T-NG-RAN). In these scenarios, a UE-associated NRPPa message can be delivered to the last serving RAN after a path switch request procedure has been completed. The last serving RAN would receive the DL UE associated NRPPa message and then page UE to resume the RRC connection.

However, for positioning messages such as the Positioning Information Request in FIG. 5 operation 2, the last serving gNB cannot provide the UE with an SRS configuration (operation 3a) when the UE has already moved reselected to the new gNB. As such, the SRS context configured in the last serving gNB would be lost and UE positioning will fail.

Figure 7:
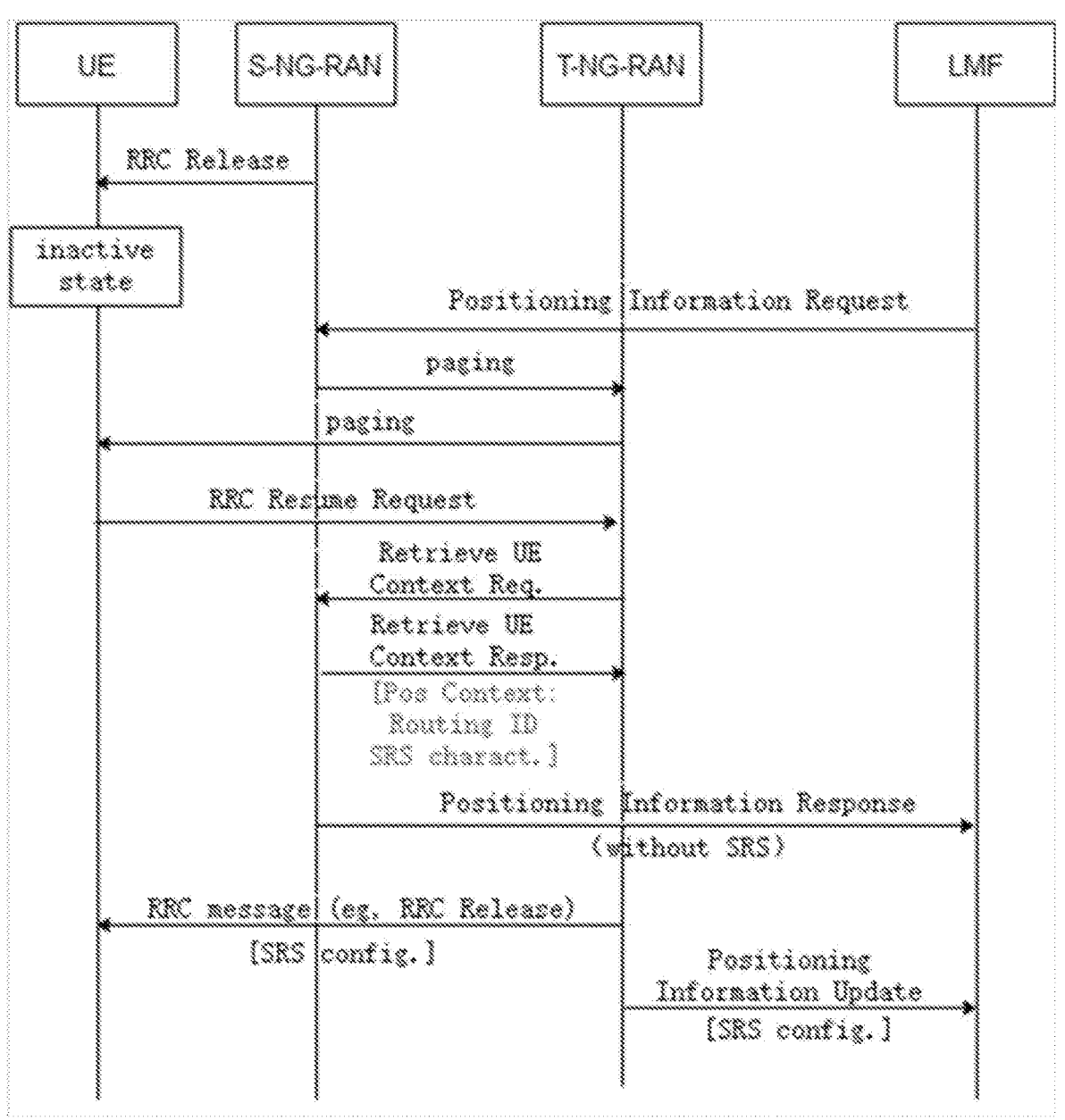
FIG. 7 shows a signal flow diagram of an exemplary positioning service continuity solution for RRC_INACTIVE UEs.

These problems for RRC_INACTIVE UEs can be more generally referred to as "positioning service continuity". FIG. 7 shows a signal flow diagram of an exemplary positioning service continuity solution for RRC_INACTIVE UEs. In this scenario, the UE enters RRC_INACTIVE state after being released by the S-NG-RAN and subsequently reselects (while in RRC_INACTIVE) to the T-NG-RAN. The LMF then sends a Positioning Information Request for the UE to the S-NG-RAN, which triggers the T-NG-RAN to page the UE. After receiving the page, the UE sends an RRCResumeRequest message to the T-NG-RAN, which then retrieves the UE context from the S-NG-RAN.

In this case, certain aspects of the Positioning Request Message can be included in the retrieved UE context, such as a routing ID (e.g., LMF identifier) and the requested SRS transmission characteristics. This can be referred to as "positioning related context". The new serving gNB (i.e., in T-NG-RAN) can configure the UE for the positioning procedures based on the received positioning related context. For example, the new serving gNB can configure SRS for the UE, e.g., in an RRCRelease message as shown in FIG. 7. The new serving gNB can also send the SRS configurations to the LMF via Positioning Information Update message.

Although the above procedure conveys UE positioning related context during a mobility event for an RRC_INAC-TIVE UE, it does not convey any measurements performed at the last serving gNB when the UE moved without notifying the last serving gNB. Using E-CID positioning as an example, there are positioning measurements such as Timing Advance (TA), UL Angle of Arrival (AoA), RS time difference (RSTD), RSRP, etc. that would be lost during reselection. The new gNB would need to measure them again after the cell-reselection. Furthermore, it is possible that a UE could move to RRC_INACTIVE during an on-going measurement procedure (operation 7 in FIG. 5) without notifying the S-NG-RAN. For at least these reasons, better mechanisms are needed to facilitate utilisation of gNB positioning measurements during RRC_INACTIVE UE mobility.

Accordingly, embodiments of the present disclosure provide flexible and efficient techniques for a first RAN node (e.g., gNB) to inform a second RAN node of the existence of any positioning measurements associated with an ongoing positioning procedure for a UE, and for the first RAN node to provide existing positioning measurements to the second RAN node. Such information can be signalled explicitly (e.g., in a separate message) or included in a UE context provided to the second RAN node.

In this manner, the second (or target) RAN node can be made aware of existing positioning measurements and does not have to repeat those. This can save energy needed to perform such measurements and to configure the UE to support such measurements. This can also reduce positioning latency as well as network signaling traffic needed to configure the UE. This can also reduce UE energy consumption that would otherwise be required to support redundant measurements by the second RAN node.

To summarize, when an RRC_INACTIVE UE reappears to (i.e., resumes in a cell served by) a second RAN node in an RNA, it can inform the second RAN node (e.g., via RRC) that it was in an ongoing positioning procedure (or session) with the first RAN node. The second RAN node can then send a request to the first RAN node for any positioning measurements associated with the ongoing positioning procedure. The requested positioning measurements can be in addition to other positioning related context, discussed above, but can be requested together with other UE context information (e.g., RRC context).

Upon receiving the context request from the second RAN node, the first RAN node include in or with the UE context any existing (e.g., partially completed) measurements associated with the ongoing positioning procedure. Alternately, the measurements can be provided in a separate and/or dedicated message or IE via XnAP interface between the two RAN nodes. After receiving this information, the second RAN node can continue the measurements using a configuration that is the same as and/or compatible with the configuration used by the first RAN node to obtain the provided measurements.

In some embodiments, the second RAN node can receive an RRCResumeRequest message from the UE. This message includes a request for resumption of a suspended RRC connection or a request to perform an RNA update. This message also includes one or more of the following: a first indication that UE had an ongoing positioning procedure with the first RAN node (i.e., the last serving RAN node in which the UE suspended the RRC connection), and a second indication that the UE had reported measurements (i.e., related to the positioning session) to the first RAN node.

Upon receiving the RRCResumeRequest message from the UE, the second RAN node can transmit a retrieve UE contest request to the first RAN node. This request can include a third indication of a request for positioning measurements associated with the UE. The third indication can be based on and/or derived from the first indication and/or the second indication received from the UE. The third indication can be independent from or integrated with (e.g., an extension of) other indications or information included in the retrieve UE contest request message.

Upon receiving this request, the first RAN node can transmit a retrieve UE context response to the second RAN node. The response indicates whether the request is accepted or rejected. In some embodiments, when the first RAN node accepts the context retrieval request, the response can be an acknowledgement message (e.g., RETRIEVE UE CON-TEXT RESPONSE message) and can include some or all of the requested positioning measurements associated with the UE. In some embodiments, the positioning measurements can be provided in a new or an existing RRC container over Xn. In other embodiments, the positioning measurements can be signaled explicitly over XnAP.

In various embodiments, the provided positioning measurements can include any of the following: gNB-RxTx Time Difference, UL-SRS-RSRP, UL-AoA, and UL relative time of arrival (RTOA). In some embodiment, the provided positioning measurements can be from multiple TRPs (e.g., measurements made by each TRP).

Table 2 below shows exemplary contents of a Retrieve UE Context Response message according to various embodiments. All definition references are to sections in 3GPP TS 38.423, to which this table could be added as a substitute for an existing table. The optional Positioning Measurements field can include any of the positioning measurements discussed above. Table 3 further defines exemplary contents of the Positioning Measurements field in Table 2.

TABLE 2

| IE/Group Name | Pres. | Range | IE type/ref. | Semantics description |
|---|---|---|---|---|
| Message Type | M | | 9.2.3.1 | |
| New NG-RAN node UE XnAP ID reference | M | | NG-RAN node UE XnAP ID 9.2.3.16 | Allocated at the new NG-RAN node |
| Old NG-RAN node UE XnAP ID reference | M | | NG-RAN node UE XnAP ID 9.2.3.16 | Allocated at the old NG-RAN node |
| GUAMI | M | | 9.2.3.24 | |
| UE Context Information | M | | 9.2.1.13 | |

TABLE 2-continued

| IE/Group Name | Pres. | Range | IE type/ref. | Semantics description |
|---|---|---|---|---|
| - Retrieve UE Context Response | | | | |
| Trace Activation | O | | 9.2.3.55 | |
| Masked IMEISV | O | | 9.2.3.32 | |
| Location Reporting Information | O | | 9.2.3.47 | Includes the necessary parameters for location reporting. |
| Criticality Diagnostics | O | | 9.2.3.3 | |
| NR V2X Services Authorized | O | | 9.2.3.105 | |
| LTE V2X Services Authorized | O | | 9.2.3.106 | |
| PC5 QOS Parameters | O | | 9.2.3.109 | This IE applies only if the UE is authorized for NR V2X services. |
| UE History Information | O | | 9.2.3.64 | |
| UE History Information from the UE | O | | 9.2.3.110 | |
| Management Based MDT PLMN List | O | | MDT PLMN List 9.2.3.133 | |
| Positioning Measurements | O | | 9.2.x | |

TABLE 3

| IE/Group Name | Pres. | Range | IE Type/ref. | Semantics |
|---|---|---|---|---|
| | | | | Description |
| List of TRPs | | 1 | | List of TRPs in the old gNB |
| >TRP ID | | | | |
| >Measured Result Item | | 1 . . . <maxnoPosMeas> | | |
| >>CHOICE Measured Results Value | M | | | |
| >>>UL Angle of Arrival | M | | | |
| >>>UL SRS-RSRP | M | | | |
| >>>UL RTOA | M | | | |
| >>>gNB Rx-Tx Time Difference | M | | | |

In other embodiments, the response from the first RAN node can indicate that the retrieve UE context request from the second RAN node was rejected. For example, the rejection can be indicated by the response being a RETRIEVE UE CONTEXT FAILURE message. Even when the first RAN node rejects the second RAN node's request, however, the first RAN node can still provide the requested positioning measurements in the RETRIEVE UE CONTEXT FAILURE message.

In some embodiments, the second RAN node can determine a new UL SRS configuration for the UE based on the positioning measurements retrieved from the first RAN node. For example, the second RAN node can determine beam directions/spatial relations, number of SRS Resource sets, resources, periodicity, TA, and/or transmit power for the new UL SRS configuration based on the retrieved positioning measurements and the previous UL SRS configuration used by the first RAN node.

For example, the second RAN node may remove from the new UL SRS configuration some of the spatial relations associated with a gNB/TRP when the UL SRS RSRP measured by that TRP (i.e., in the retrieved positioning measurements) is relatively weak. Similarly, the second RAN node can include in the new UL SRS configuration some spatial relations from another TRP based on UL AoA results (i.e., in the retrieved positioning measurements) indicating that the UE is moving towards the other TRP.

As another example, the second RAN node may increase or decrease the UL SRS Resource sets and resources (per set) based upon the retrieved positioning measurements. More specifically, the second RAN node can increase the number of resources for relatively weak measurements. Likewise, for relatively strong measurements, the second RAN node can decrease or maintain the number of resources and/or increase the periodicity to reduce UE energy consumption.

The second RAN node can send the UE the new UL SRS configuration determined in this manner. Likewise, the second RAN node can send the new UL SRS configuration to the LMF, e.g., via NRPPa POSITIONING INFORMATION RESPONSE or NRPPa POSITIONING INFORMATION UPDATE message.

Figure 8:
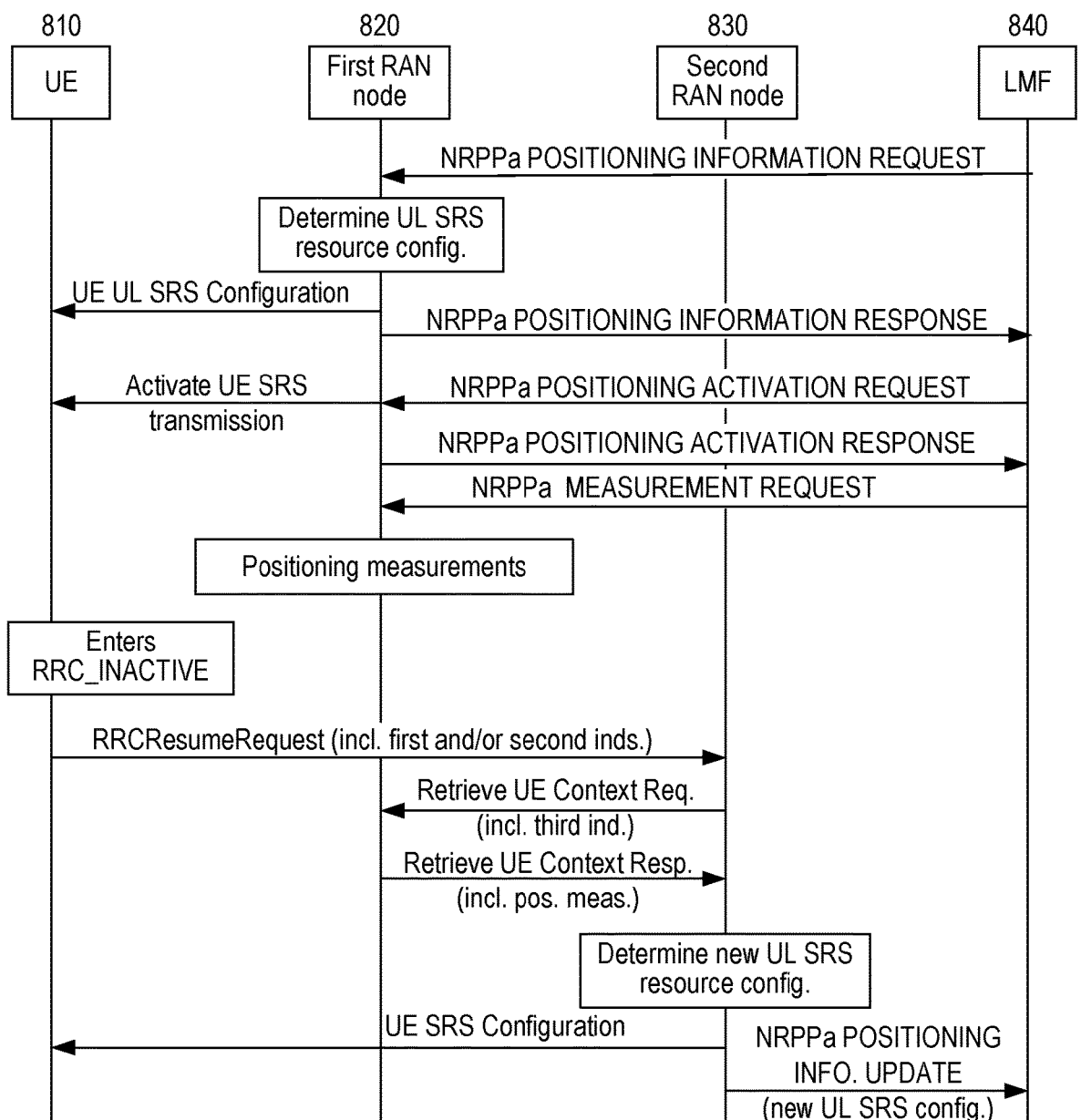
FIG. 8 shows a signaling diagram between a UE, a first RAN node, a second RAN node, and a location management function (LMF), according to various embodiments of the present disclosure.

FIG. 8 shows a signaling diagram between a UE (810), the first RAN node (820), the second RAN node (830), and an LMF (840) according to various embodiments described above. The messages in the top part of FIG. 8 are substantially similar to those shown in FIG. 5, with the exception that activity of neighbor gNBs/TRPs is omitted for brevity. After the first RAN node performs positioning measurements, the UE enters RRC_INACTIVE state. Later, the UE attempts to resume the RRC connection with the second RAN node by sending a RRCResumeRequest message, which can include either or both of the first and second indications discussed above.

The second RAN node receives the UE context including the positioning measurements from the first RAN node. The received UE context may also include the UL SRS resource configuration previously determined by the first RAN node, which may be associated with some or all of the positioning measurements provided. The second RAN node determines a new UL SRS configuration based on the positioning measurements and, optionally, the previous UL SRS resource configuration. The second RAN node provides this to the UE and to the LMF via an NRPPa POSITIONING INFORMATION UPDATE message. As illustrated in FIG. 5, the second RAN node can perform positioning measurements of UL SRS transmitted by the UE based on the new UL SRS configuration, and provide such measurements to the LMF.

Figure 9:
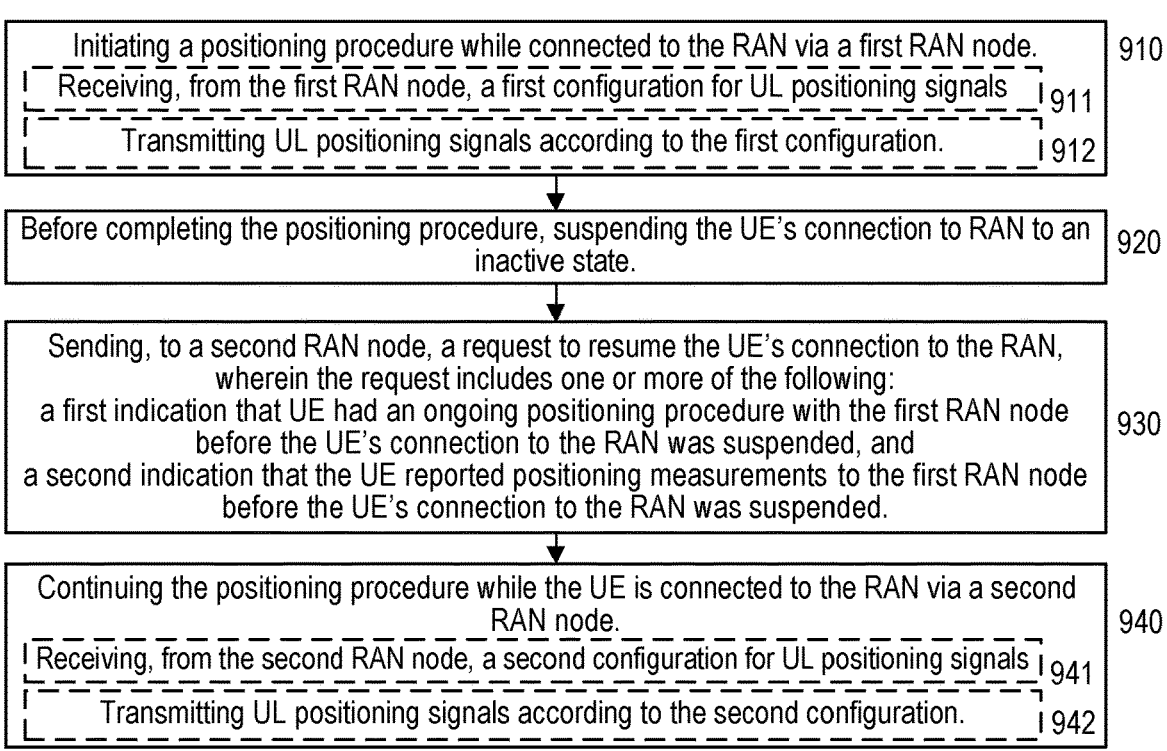
FIG. 9 shows a flow diagram of an exemplary method (e.g., procedure) for a UE, according to various exemplary embodiments of the present disclosure.
Figure 10:
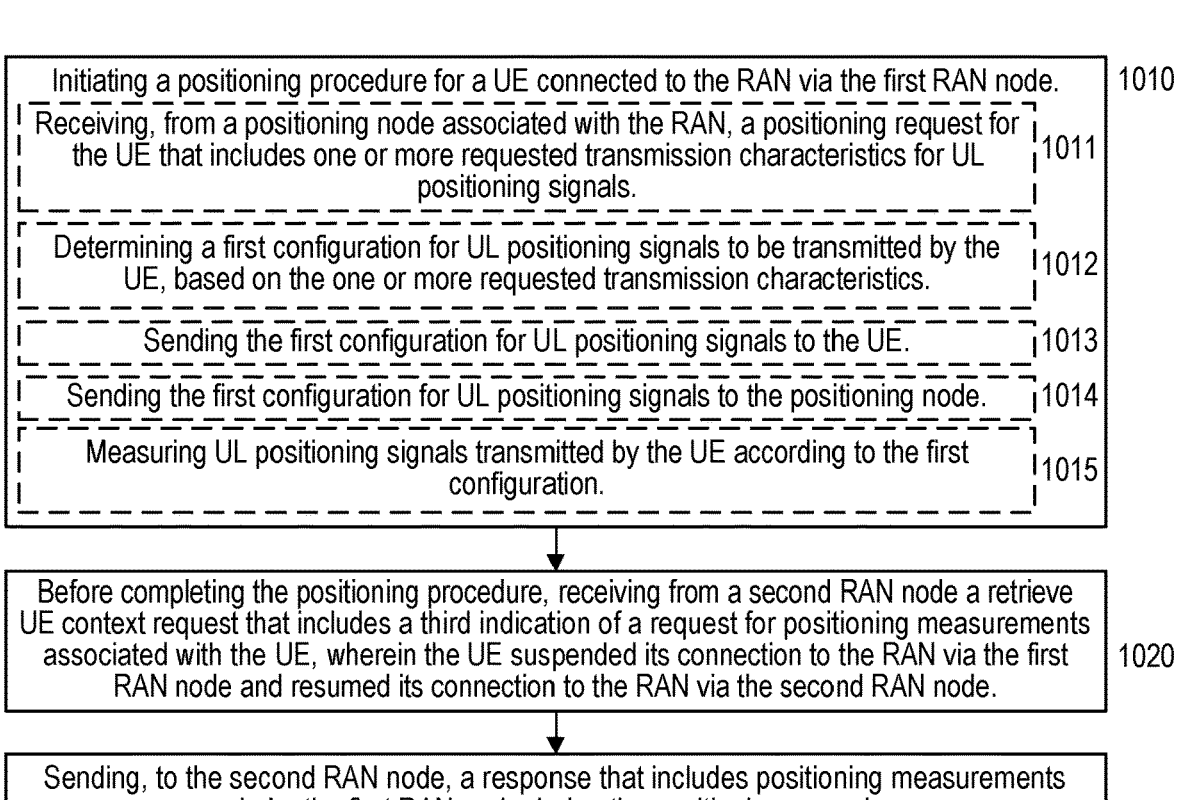
FIG. 10 shows a flow diagram of an exemplary method (e.g., procedure) for a first RAN node (e.g., gNB, TRP, etc.), according to various embodiments of the present disclosure.

Various features of the embodiments described above correspond to various operations illustrated in FIGS. 9-12, which show exemplary methods (e.g., procedures) for a UE, a first 20) RAN node, a second RAN node, and a positioning node, respectively. In other words, various features of the operations described below correspond to various embodiments described above. Furthermore, the exemplary methods shown in FIGS. 9-12 can be used cooperatively to provide various benefits, advantages, and/or solutions to problems described herein. Although FIGS. 9-11 show specific blocks in particular orders, the operations of the exemplary methods can be performed in different orders than shown and can be combined and/or divided into blocks having different functionality than shown. Optional blocks or operations are indicated by dashed lines.

In particular, FIG. 9 shows an exemplary method (e.g., procedure) for a UE configured for positioning in a RAN, according to various embodiments of the present disclosure. The exemplary method can be performed by a UE (e.g., wireless device, etc.) such as described elsewhere herein.

The exemplary method can include the operations of block 910, where the UE can initiate a positioning (e.g., UL-TDOA) procedure while the UE is connected to the RAN via a first RAN node. The exemplary method can also include the operations of block 920, where before completing the positioning procedure, the UE can suspend its connection to the RAN to an inactive state. The exemplary method can also include the operations of block 930, where the UE can send to a second RAN node a request to resume the UE's connection to the RAN. The request includes one or more of the following: a first indication that UE had an ongoing positioning procedure with the first RAN node before the UE's connection to the RAN was suspended, and a second indication that the UE reported positioning measurements to the first RAN node before the UE's connection to the RAN was suspended. The exemplary method can also include the operations of block 940, where the UE can continue the positioning procedure while the UE is connected to the RAN via the second RAN node.

In some embodiments, initiating the positioning procedure in block 910 can include the operations of sub-blocks 911-912, where the UE can receive from the first RAN node a first configuration for UL positioning signals to be transmitted by the UE and transmit UL positioning signals according to the first configuration. For example, the first configuration can be an UL SRS resource configuration, such as discussed above.

In some embodiments, continuing the positioning procedure in block 940 can include the operations of sub-blocks 941-942, where the UE can receive from the second RAN node a second configuration for UL positioning signals to be transmitted by the UE and transmit UL positioning signals according to the second configuration. For example, the second configuration can be an UL SRS resource configuration, such as discussed above. In some embodiments, the second configuration includes one or more of the following configuration elements that differ from corresponding configuration elements of the first configuration:

beam directions;
    spatial relations between beams;
    transmission periodicity;
    transmission timing advance (TA);
    transmission power;
    reference signal (RS) resource sets; and
    resources per RS resource set.

In addition, FIG. 10 shows an exemplary method (e.g., procedure) for a first RAN node configured to support positioning of UEs in the RAN, according to various embodiments of the present disclosure. The exemplary method can be performed by a network node (e.g., base station, eNB, gNB, ng-eNB, TRP, etc.) such as described elsewhere herein.

The exemplary method can include the operations of block 1010, where the first RAN node can initiate a positioning (e.g., UL-TDOA) procedure for a UE connected to the RAN via the first RAN node. The exemplary method can also include the operations of block 1020, where before completing the positioning procedure, the first RAN node can receive from a second RAN node a retrieve UE context request that includes a third indication of a request for positioning measurements associated with the UE. The exemplary method can also include the operations of block 1030, where the first RAN node can send to the second RAN node a response that includes positioning measurements made by the first RAN node during the positioning procedure.

In some embodiments, initiating the positioning procedure in block 1010 can include the operations of sub-blocks 1013 and 1015, where the first RAN node can send the UE a first configuration for UL positioning signals to be transmitted by the UE and measure UL positioning signals transmitted by the UE according to the first configuration. For example, the first configuration can be an UL SRS resource configuration, such as discussed above. In some embodiments, initiating the positioning procedure in block 1010 can also include the following operations, labelled with corresponding sub-block numbers:

(1011) receiving, from a positioning node associated with the RAN, a positioning request for the UE that includes one or more requested transmission characteristics for UL positioning signals;
    (1012) determining the first configuration for UL positioning signals based on the one or more requested transmission characteristics; and
    (1014) sending the first configuration for UL positioning signals to the positioning node in response to the positioning request.

In various embodiments, the response sent to the second RAN node in block 1030 can be one of the following:

a retrieve UE context response message that includes the UE context (note that the positioning measurements may be included in or separate from the UE context);

a retrieve UE context failure message, i.e., that includes the positioning measurements but excludes the UE context; or a message other than the retrieve UE context response message or the retrieve UE context failure message.

In various embodiments, the response sent to the second RAN node in block 1030 can also include a first configuration for UL positioning signals transmitted by the UE in relation to the positioning measurements included in the response. In some of these embodiments, the positioning measurements can include one or more of the following:

receive-transmit (RxTx) time difference at the first RAN node; and one or more of the following measured by the first RAN node on the positioning signals transmitted by the UE according to the first configuration: reference signal received power (RSRP), angle of arrival (AoA), and relative time of arrival (RTOA).

In some embodiments, the positioning measurements can include positioning measurements made by multiple TRPs associated with the first RAN node. An example data structure used to send positioning measurements is shown above in Table 3.

In addition, FIG. 11 shows an exemplary method (e.g., procedure) for a second RAN node configured to support positioning of UEs in the RAN, according to various embodiments of the present disclosure. The exemplary method can be performed by a network node (e.g., base station, eNB, gNB, ng-eNB, TRP, etc.) such as described elsewhere herein.

The exemplary method can include the operations of block 1110, where the second RAN node can receive, from a UE, a request to resume a suspended connection to the RAN. The request includes one or more of the following: a first indication that UE had an ongoing positioning procedure with the first RAN node before the connection was suspended, and a second indication that the UE reported positioning measurements to the first RAN node before the connection was suspended. The exemplary method can also include the operations of block 1120, where the second RAN node can retrieve from the first RAN node positioning measurements made by the first RAN node during the positioning procedure. The exemplary method can also include the operations of block 1130, where the second RAN node can continue the positioning procedure for the UE while the UE is connected to the RAN via the second RAN node.

In some embodiments, the positioning procedure is an UL-TDOA procedure. In some embodiments, the retrieved positioning measurements include positioning measurements made by multiple transmission reception points (TRPs) associated with the first RAN node. An example data structure used to retrieve positioning measurements is shown above in Table 3.

In some embodiments, retrieving the positioning measurements in block 1120 can include the operations of sub-blocks 1121-1122, where the second RAN node can send to the first RAN node a retrieve UE context request that includes a third indication of a request for positioning measurements associated with the UE; and receive from the first RAN node a response that includes the positioning measurements made by the first RAN node during the positioning procedure. In some of these embodiments, the third indication is based on at least one of the first and second indications, i.e., one or more of these indications that are included in the request received in block 1110.

In some of these embodiments, the response can be one of the following:

a retrieve UE context response message that includes the UE context (note that the positioning measurements may be included in or separate from the UE context);

a retrieve UE context failure message, i.e., that includes the positioning measurements but excludes the UE context; or a message other than the retrieve UE context response message or the retrieve UE context failure message.

In some of these embodiments, the response also includes a first configuration for UL positioning signals transmitted by the UE in relation to the positioning measurements.

In some embodiments, the retrieved positioning measurements can include one or more of the following:

receive-transmit (RxTx) time difference at the first RAN node; and one or more of the following measured by the first RAN node on the positioning signals transmitted by the UE according to the first configuration: reference signal received power (RSRP), angle of arrival (AoA), and relative time of arrival (RTOA).

In some embodiments, continuing the positioning procedure in block 1130 can include the operations of sub-blocks 1131-1133, where the UE can determine a second configuration for UL positioning signals (i.e., to be transmitted by the UE) based on the retrieved positioning measurements, send the second configuration to the UE, and measure UL positioning signals transmitted by the UE according to the second configuration.

In some of these embodiments, determining the second configuration in sub-block 1131 can be further based on a first configuration for UL positioning signals transmitted by the UE in relation to the retrieved positioning measurements. The first configuration can be retrieved from the first RAN node in association with the positioning measurements (e.g., in block 1120). For example, the first and second configurations can be UL SRS resource configurations, such as discussed above. In some variants, the second configuration (e.g., determined in sub-block 1131) can include one or more configuration elements that differ from corresponding configuration elements of the first configuration, such as described above in relation to UE embodiments shown in FIG. 9.

In some of these embodiments, the exemplary method can also include the operations of block 1140, where the second RAN node can send the second configuration for UL positioning signals to a positioning node (e.g., LMF) associated with the RAN.

In addition, FIG. 12 shows an exemplary method (e.g., procedure) for a positioning node configured to operate with a RAN, according to various embodiments of the present disclosure. The exemplary method can be performed by a positioning node (e.g., LMF, E-SMLC, SUPL, etc.) described elsewhere herein.

The exemplary method can include the operations of block 1210, where the positioning node can initiate a positioning (e.g., UL TDOA) procedure for a UE connected to the RAN via a first RAN node. The exemplary method can also include the operations of block 1220, where the positioning node can receive, from the first RAN node, a first configuration for UL positioning signals to be transmitted by the UE. The exemplary method can also include the operations of block 1220, where before completing the positioning procedure, the positioning node can receive, from a second RAN node, a second configuration for UL positioning signals to be transmitted by the UE, which suspended its connection to the RAN via the first RAN node and resumed its connection to the RAN via the second RAN node.

In some embodiments, initiating the positioning procedure in block 1210 includes the operations of sub-block 1211, where the positioning node can send to a first RAN node a positioning request for the UE that includes one or more requested transmission characteristics for UL positioning signals. In such case, the first configuration is based on the one or more requested transmission characteristics.

In some embodiments, the exemplary method can also include the operations of block 1240, where the positioning node can receive the following from the second RAN node:

first positioning measurements made by the first RAN node of UL positioning signals transmitted by the UE based on the first configuration; and second positioning measurements made by the second RAN node of UL positioning signals transmitted by the UE based on the second configuration.

For example, the positioning node can determine the UE's position based on the first and second positioning measurements.

In some embodiments, the second configuration (e.g., received in block 1230) can include one or more configuration elements that differ from corresponding configuration elements of the first configuration (e.g., received in block 1220), such as described above in relation to UE embodiments shown in FIG. 9.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 13:
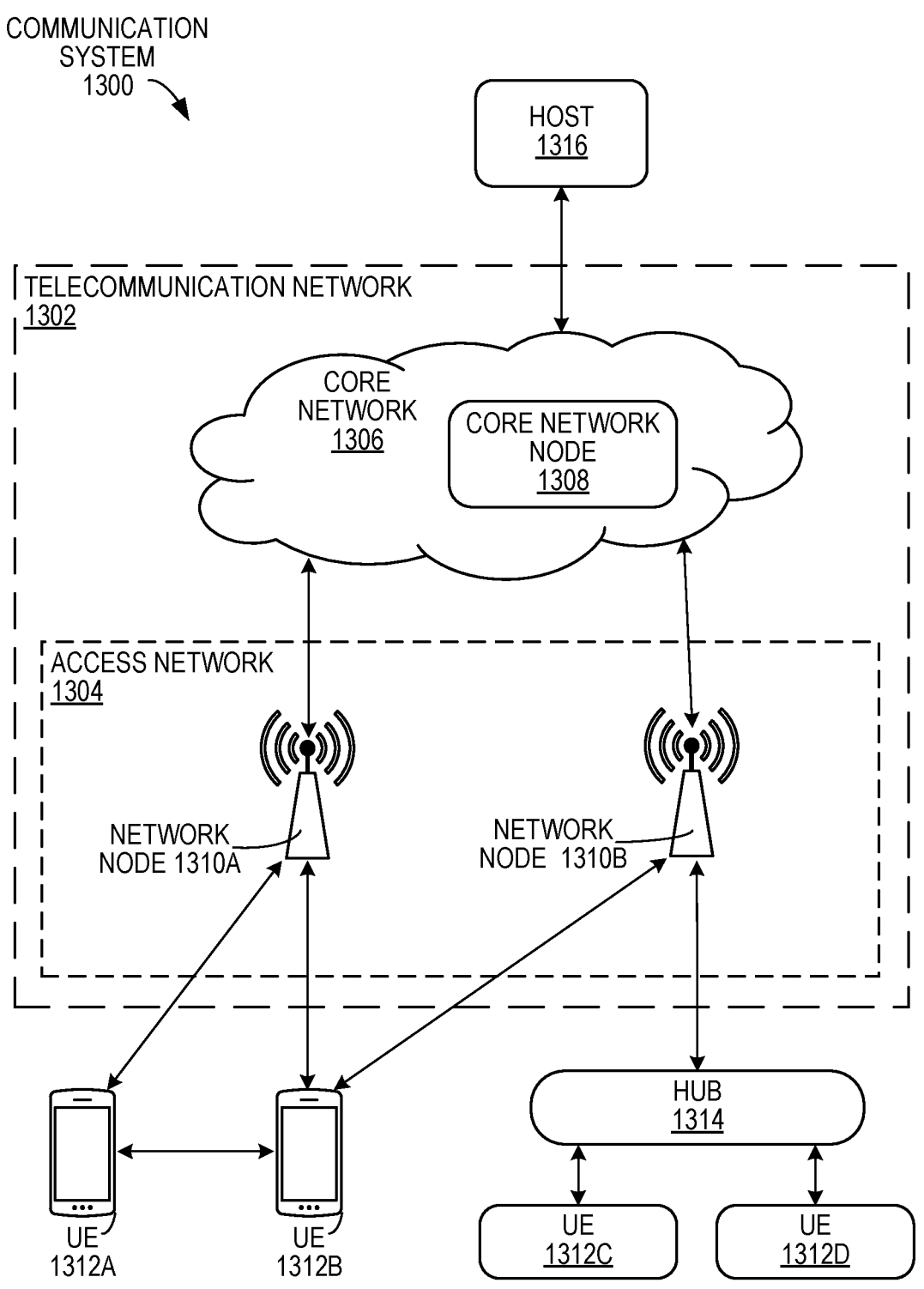
FIG. 13 shows a communication system according to various embodiments of the present disclosure.

FIG. 13 shows an example of a communication system 1300 in accordance with some embodiments. In this example, the communication system 1300 includes a telecommunication network 1302 that includes an access network 1304, such as a radio access network (RAN), and a core network 1306, which includes one or more core network nodes 1308. The access network 1304 includes one or more access network nodes, such as network nodes 1310*a* and 1310*b* (one or more of which may be generally referred to as network nodes 1310), or any other similar 3GPP access node or non-3GPP access point. The network nodes 1310 facilitate direct or indirect connection of UEs, such as by connecting UEs 1312*a*, 1312*b*, 1312*c*, and 1312*d* (one or more of which may be generally referred to as UEs 1312) to core network 1306 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1300 may include any number of wired or wireless networks, network nodes, UEs, and/or any other components or systems that may facilitate or participate in the communication of data and/or signals whether via wired or wireless connections. The communication system 1300 may include and/or interface with any type of communication, telecommunication, data, cellular, radio network, and/or other similar type of system.

The UEs 1312 may be any of a wide variety of communication devices, including wireless devices arranged, configured, and/or operable to communicate wirelessly with the network nodes 1310 and other communication devices. Similarly, the network nodes 1310 are arranged, capable, configured, and/or operable to communicate directly or indirectly with the UEs 1312 and/or with other network nodes or equipment in the telecommunication network 1302 to enable and/or provide network access, such as wireless network access, and/or to perform other functions, such as administration in the telecommunication network 1302.

In the depicted example, the core network 1306 connects the network nodes 1310 to one or more hosts, such as host 1316. These connections may be direct or indirect via one or more intermediary networks or devices. In other examples, network nodes may be directly coupled to hosts. The core network 1306 includes one more core network nodes (e.g., core network node 1308) that are structured with hardware and software components. Features of these components may be substantially similar to those described with respect to the UEs, network nodes, and/or hosts, such that the descriptions thereof are generally applicable to the corresponding components of the core network node 1308. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), Location Management Function (LMF), Enhanced Serving Mobile Location Center (E-SMLC), SUPL Location Platform (SLP), and/or a User Plane Function (UPF).

The host 1316 may be under the ownership or control of a service provider other than an operator or provider of the access network 1304 and/or the telecommunication network 1302, and may be operated by the service provider or on behalf of the service provider. The host 1316 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1300 of FIG. 13 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1302 is a cellular network that implements 3GPP standardized features. Accordingly, the telecommunications network 1302 may support network slicing to provide different logical networks to different devices that are connected to the telecommunication network 1302. For example, the telecommunications network 1302 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1312 are configured to transmit and/or receive information without direct human interaction. For instance, a UE may be designed to transmit information to the access network 1304 on a predetermined schedule, when triggered by an internal or external event, or in response to requests from the access network 1304. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1314 communicates with the access network 1304 to facilitate indirect communication between one or more UEs (e.g., UE 1312*c* and/or 1312*d*) and network nodes (e.g., network node 1310*b*). In some examples, the hub 1314 may be a controller, router, content source and analytics, or any of the other communication devices described herein regarding UEs. For example, the hub 1314 may be a broadband router enabling access to the core network 1306 for the UEs. As another example, the hub 1314 may be a controller that sends commands or instructions to one or more actuators in the UEs. Commands or instructions may be received from the UEs, network nodes 1310, or by executable code, script, process, or other instructions in the hub 1314. As another example, the hub 1314 may be a data collector that acts as temporary storage for UE data and, in some embodiments, may perform analysis or other processing of the data. As another example, the hub 1314 may be a content source. For example, for a UE that is a VR headset, display, loudspeaker or other media delivery device, the hub 1314 may retrieve VR assets, video, audio, or other media or data related to sensory information via a network node, which the hub 1314 then provides to the UE either directly, after performing local processing, and/or after adding additional local content. In still another example, the hub 1314 acts as a proxy server or orchestrator for the UEs, in particular in if one or more of the UEs are low energy IoT devices.

The hub 1314 may have a constant/persistent or intermittent connection to the network node 1310*b*. The hub 1314 may also allow for a different communication scheme and/or schedule between the hub 1314 and UEs (e.g., UE 1312*c* and/or 1312*d*), and between the hub 1314 and the core network 1306. In other examples, the hub 1314 is connected to the core network 1306 and/or one or more UEs via a wired connection. Moreover, the hub 1314 may be configured to connect to an M2M service provider over the access network 1304 and/or to another UE over a direct connection. In some scenarios, UEs may establish a wireless connection with the network nodes 1310 while still connected via the hub 1314 via a wired or wireless connection. In some embodiments, the hub 1314 may be a dedicated hub—that is, a hub whose primary function is to route communications to/from the UEs from/to the network node 1310*b*. In other embodiments, the hub 1314 may be a non-dedicated hub—that is, a device which is capable of operating to route communications between the UEs and network node 1310*b*, but which is additionally capable of operating as a communication start and/or end point for certain data channels.

Figure 14:
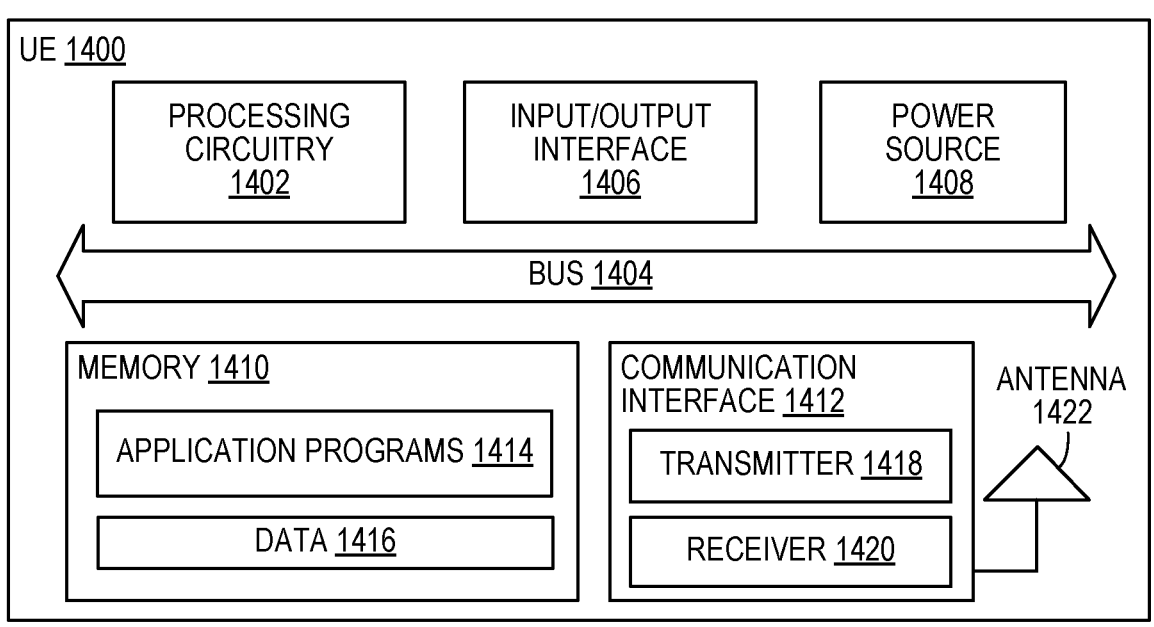
FIG. 14 shows a UE according to various embodiments of the present disclosure.

FIG. 14 shows a UE 1400 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1400 includes processing circuitry 1402 that is operatively coupled via a bus 1404 to an input/output interface 1406, a power source 1408, a memory 1410, a communication interface 1412, and/or any other component, or any combination thereof. Certain UEs may utilize all or a subset of the components shown in FIG. 14. The level of integration between the components may vary from one UE to another UE. Further, certain UEs may contain multiple instances of a component, such as multiple processors, memories, transceivers, transmitters, receivers, etc.

The processing circuitry 1402 is configured to process instructions and data and may be configured to implement any sequential state machine operative to execute instructions stored as machine-readable computer programs in the memory 1410. The processing circuitry 1402 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1402 may include multiple central processing units (CPUs).

In the example, the input/output interface 1406 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1400. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1408 is structured as a battery or battery pack. Other types of power sources, such as an external power source (e.g., an electricity outlet), photovoltaic device, or power cell, may be used. The power source 1408 may further include power circuitry for delivering power from the power source 1408 itself, and/or an external power source, to the various parts of the UE 1400 via input circuitry or an interface such as an electrical power cable. Delivering power may be, for example, for charging of the power source 1408. Power circuitry may perform any formatting, converting, or other modification to the power from the power source 1408 to make the power suitable for the respective components of the UE 1400 to which power is supplied.

The memory 1410 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1410 includes one or more application programs 1414, such as an operating system, web browser application, a widget, gadget engine, or other application, and corresponding data 1416. The memory 1410 may store, for use by the UE 1400, any of a variety of various operating systems or combinations of operating systems.

The memory 1410 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1410 may allow the UE 1400 to access instructions, application programs and the like, stored on transitory or non-transitory memory media, to off-load data, or to upload data. An article of manufacture, such as one utilizing a communication system may be tangibly embodied as or in the memory 1410, which may be or comprise a device-readable storage medium.

The processing circuitry 1402 may be configured to communicate with an access network or other network using the communication interface 1412. The communication interface 1412 may comprise one or more communication subsystems and may include or be communicatively coupled to an antenna 1422. The communication interface 1412 may include one or more transceivers used to communicate, such as by communicating with one or more remote transceivers of another device capable of wireless communication (e.g., another UE or a network node in an access network). Each transceiver may include a transmitter 1418 and/or a receiver 1420 appropriate to provide network communications (e.g., optical, electrical, frequency allocations, and so forth). Moreover, the transmitter 1418 and receiver 1420 may be coupled to one or more antennas (e.g., antenna 1422) and may share circuit components, software or firmware, or alternatively be implemented separately.

In the illustrated embodiment, communication functions of the communication interface 1412 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1412, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1400 shown in FIG. 14.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may implement the 3GPP NB-IoT standard and/or be referred to as an MTC device. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 15:
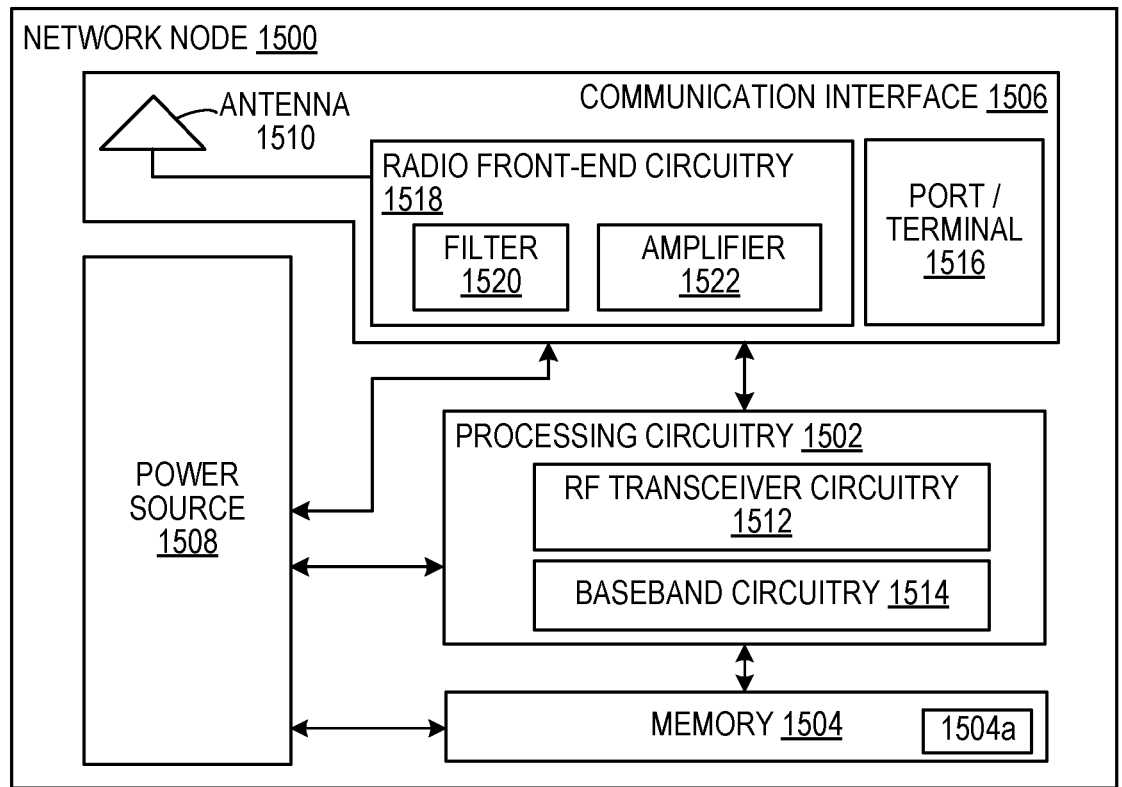
FIG. 15 shows a network node according to various embodiments of the present disclosure.

FIG. 15 shows a network node 1500 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., LMFs, E-SMLCs, SLPs, etc.), and/or Minimization of Drive Tests (MDTs).

The network node 1500 includes a processing circuitry 1502, a memory 1504, a communication interface 1506, and a power source 1508. The network node 1500 may be composed of multiple physically separate components (e.g., a NodeB component and a RNC component, or a BTS component and a BSC component, etc.), which may each have their own respective components. In certain scenarios in which the network node 1500 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1500 may be configured to support multiple radio access technologies (RATs). In such embodiments, some components may be duplicated (e.g., separate memory 1504 for different RATs) and some components may be reused (e.g., a same antenna 1510 may be shared by different RATs). The network node 1500 may also include multiple sets of the various illustrated components for different wireless technologies integrated into network node 1500, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1500.

The processing circuitry 1502 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1500 components, such as the memory 1504, to provide network node 1500 functionality.

In some embodiments, the processing circuitry 1502 includes a system on a chip (SOC). In some embodiments, the processing circuitry 1502 includes one or more of radio frequency (RF) transceiver circuitry 1512 and baseband processing circuitry 1514. In some embodiments, the radio frequency (RF) transceiver circuitry 1512 and the baseband processing circuitry 1514 may be on separate chips (or sets of chips), boards, or units, such as radio units and digital units. In alternative embodiments, part or all of RF transceiver circuitry 1512 and baseband processing circuitry 1514 may be on the same chip or set of chips, boards, or units.

The memory 1504 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1502. The memory 1504 may store any suitable instructions, data, or information, including a computer program, software, an application including one or more of logic, rules, code, tables, and/or other instructions (collectively denoted computer program product 1504a) capable of being executed by the processing circuitry 1502 and utilized by the network node 1500. The memory 1504 may be used to store any calculations made by the processing circuitry 1502 and/or any data received via the communication interface 1506. In some embodiments, the processing circuitry 1502 and memory 1504 is integrated.

The communication interface 1506 is used in wired or wireless communication of signaling and/or data between a network node, access network, and/or UE. As illustrated, the communication interface 1506 comprises port(s)/terminal(s) 1516 to send and receive data, for example to and from a network over a wired connection. The communication interface 1506 also includes radio front-end circuitry 1518 that may be coupled to, or in certain embodiments a part of, the antenna 1510. Radio front-end circuitry 1518 comprises filters 1520 and amplifiers 1522. The radio front-end circuitry 1518 may be connected to an antenna 1510 and processing circuitry 1502. The radio front-end circuitry may be configured to condition signals communicated between antenna 1510 and processing circuitry 1502. The radio front-end circuitry 1518 may receive digital data that is to be sent out to other network nodes or UEs via a wireless connection. The radio front-end circuitry 1518 may convert the digital data into a radio signal having the appropriate channel and bandwidth parameters using a combination of filters 1520 and/or amplifiers 1522. The radio signal may then be transmitted via the antenna 1510. Similarly, when receiving data, the antenna 1510 may collect radio signals which are then converted into digital data by the radio front-end circuitry 1518. The digital data may be passed to the processing circuitry 1502. In other embodiments, the communication interface may comprise different components and/or different combinations of components.

In certain alternative embodiments, the network node 1500 does not include separate radio front-end circuitry 1518, instead, the processing circuitry 1502 includes radio front-end circuitry and is connected to the antenna 1510. Similarly, in some embodiments, all or some of the RF transceiver circuitry 1512 is part of the communication interface 1506. In still other embodiments, the communication interface 1506 includes one or more ports or terminals 1516, the radio front-end circuitry 1518, and the RF transceiver circuitry 1512, as part of a radio unit (not shown), and the communication interface 1506 communicates with the baseband processing circuitry 1514, which is part of a digital unit (not shown).

The antenna 1510 may include one or more antennas, or antenna arrays, configured to send and/or receive wireless signals. The antenna 1510 may be coupled to the radio front-end circuitry 1518 and may be any type of antenna capable of transmitting and receiving data and/or signals wirelessly. In certain embodiments, the antenna 1510 is separate from the network node 1500 and connectable to the network node 1500 through an interface or port.

The antenna 1510, communication interface 1506, and/or the processing circuitry 1502 may be configured to perform any receiving operations and/or certain obtaining operations described herein as being performed by the network node. Any information, data and/or signals may be received from a UE, another network node and/or any other network equipment. Similarly, the antenna 1510, the communication interface 1506, and/or the processing circuitry 1502 may be configured to perform any transmitting operations described herein as being performed by the network node. Any information, data and/or signals may be transmitted to a UE, another network node and/or any other network equipment.

The power source 1508 provides power to the various components of network node 1500 in a form suitable for the respective components (e.g., at a voltage and current level needed for each respective component). The power source 1508 may further comprise, or be coupled to, power management circuitry to supply the components of the network node 1500 with power for performing the functionality described herein. For example, the network node 1500 may be connectable to an external power source (e.g., the power grid, an electricity outlet) via an input circuitry or interface such as an electrical cable, whereby the external power source supplies power to power circuitry of the power source 1508. As a further example, the power source 1508 may comprise a source of power in the form of a battery or battery pack which is connected to, or integrated in, power circuitry. The battery may provide backup power should the external power source fail.

Embodiments of the network node 1500 may include additional components beyond those shown in FIG. 15 for providing certain aspects of the network node's functionality, including any of the functionality described herein and/or any functionality necessary to support the subject matter described herein. For example, the network node 1500 may include user interface equipment to allow input of information into the network node 1500 and to allow output of information from the network node 1500. This may allow a user to perform diagnostic, maintenance, repair, and other administrative functions for the network node 1500.

Figure 16:
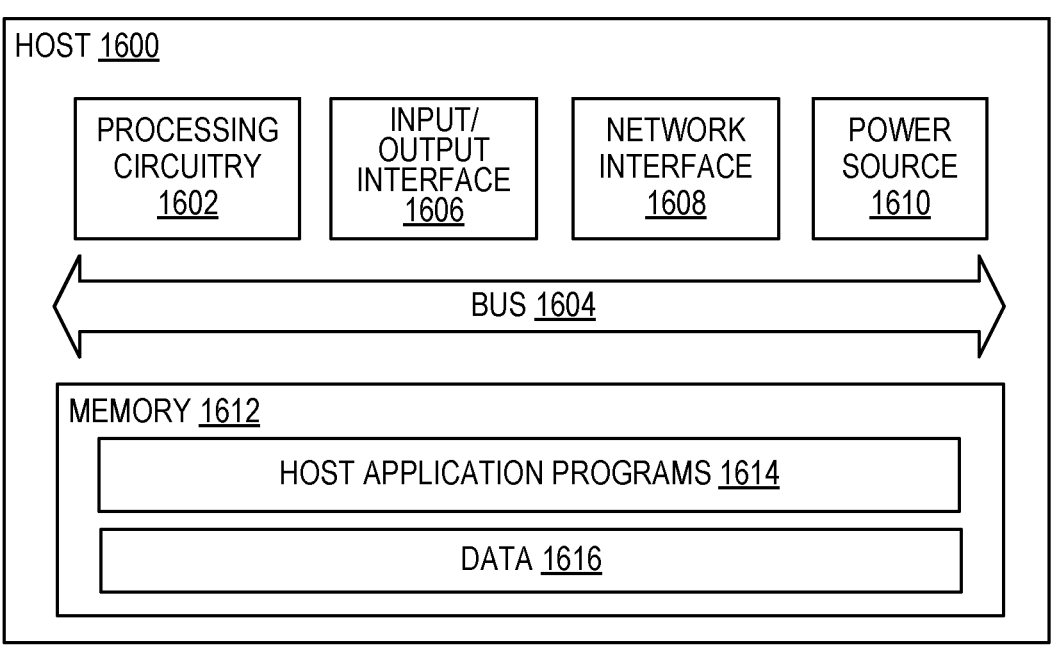
FIG. 16 shows host computing system according to various embodiments of the present disclosure.

FIG. 16 is a block diagram of a host 1600, which may be an embodiment of the host 1316 of FIG. 13, in accordance with various aspects described herein. As used herein, the host 1600 may be or comprise various combinations hardware and/or software, including a standalone server, a blade server, a cloud-implemented server, a distributed server, a virtual machine, container, or processing resources in a server farm. The host 1600 may provide one or more services to one or more UEs.

The host 1600 includes processing circuitry 1602 that is operatively coupled via a bus 1604 to an input/output interface 1606, a network interface 1608, a power source 1610, and a memory 1612. Other components may be included in other embodiments. Features of these components may be substantially similar to those described with respect to the devices of previous figures, such as FIGS. 14 and 15, such that the descriptions thereof are generally applicable to the corresponding components of host 1600.

The memory 1612 may include one or more computer programs including one or more host application programs 1614 and data 1616, which may include user data, e.g., data generated by a UE for the host 1600 or data generated by the host 1600 for a UE. Embodiments of the host 1600 may utilize only a subset or all of the components shown. The host application programs 1614 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1614 may also provide for user authentication and licensing checks and may periodically report health, routes, and content availability to a central node, such as a device in or on the edge of a core network. Accordingly, the host 1600 may select and/or indicate a different host for over-the-top services for a UE. The host application programs 1614 may support various protocols, such as the HTTP Live Streaming (HLS) protocol, Real- Time Messaging Protocol (RTMP), Real-Time Streaming Protocol (RTSP), Dynamic Adaptive Streaming over HTTP (MPEG-DASH), etc.

Figure 17:
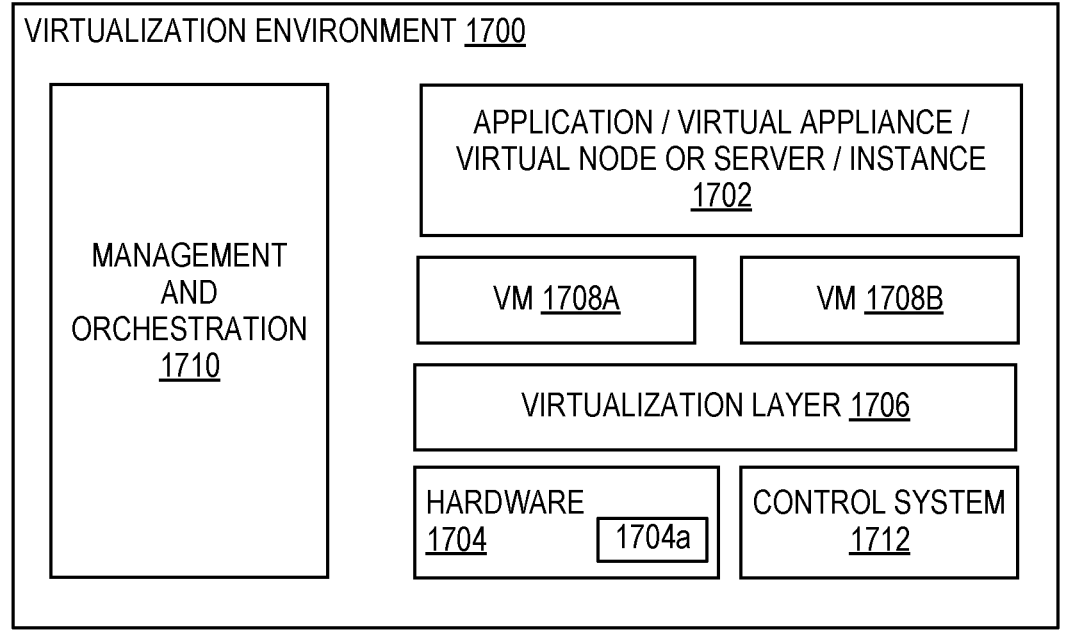
FIG. 17 is a block diagram of a virtualization environment in which functions implemented by some embodiments of the present disclosure may be virtualized.

FIG. 17 is a block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1700 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1702 (which may alternatively be called software instances, virtual appliances, network functions, virtual nodes, virtual network functions, etc.) are run in the virtualization environment 1600 to implement some of the features, functions, and/or benefits of various embodiments disclosed herein.

Hardware 1704 includes processing circuitry, memory that stores software and/or instructions (collectively denoted computer program product 1704a) executable by hardware processing circuitry, and/or other hardware devices as described herein, such as a network interface, input/output interface, and so forth. Software may be executed by the processing circuitry to instantiate one or more virtualization layers 1706 (also referred to as hypervisors or virtual machine monitors (VMMs)), provide VMs 1708a and 1708b (one or more of which may be generally referred to as VMs 1708), and/or perform any of the functions, features and/or benefits described in relation with some embodiments described herein. The virtualization layer 1706 may present a virtual operating platform that appears like networking hardware to the VMs 1708.

The VMs 1708 comprise virtual processing, virtual memory, virtual networking or interface and virtual storage, and may be run by a corresponding virtualization layer 1706. Different embodiments of the instance of a virtual appliance 1702 may be implemented on one or more of VMs 1708, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1708 may be a software implementation of a physical machine that runs programs as if they were executing on a physical, non-virtualized machine. Each of the VMs 1708, and that part of hardware 1704 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1708 on top of the hardware 1704 and corresponds to the application 1702.

Hardware 1704 may be implemented in a standalone network node with generic or specific components. Hardware 1704 may implement some functions via virtualization. Alternatively, hardware 1704 may be part of a larger cluster of hardware (e.g., such as in a data center or CPE) where many hardware nodes work together and are managed via management and orchestration 1710, which, among others, oversees lifecycle management of applications 1702. In some embodiments, hardware 1704 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1712 which may alternatively be used for communication between hardware nodes and radio units.

Figure 18:
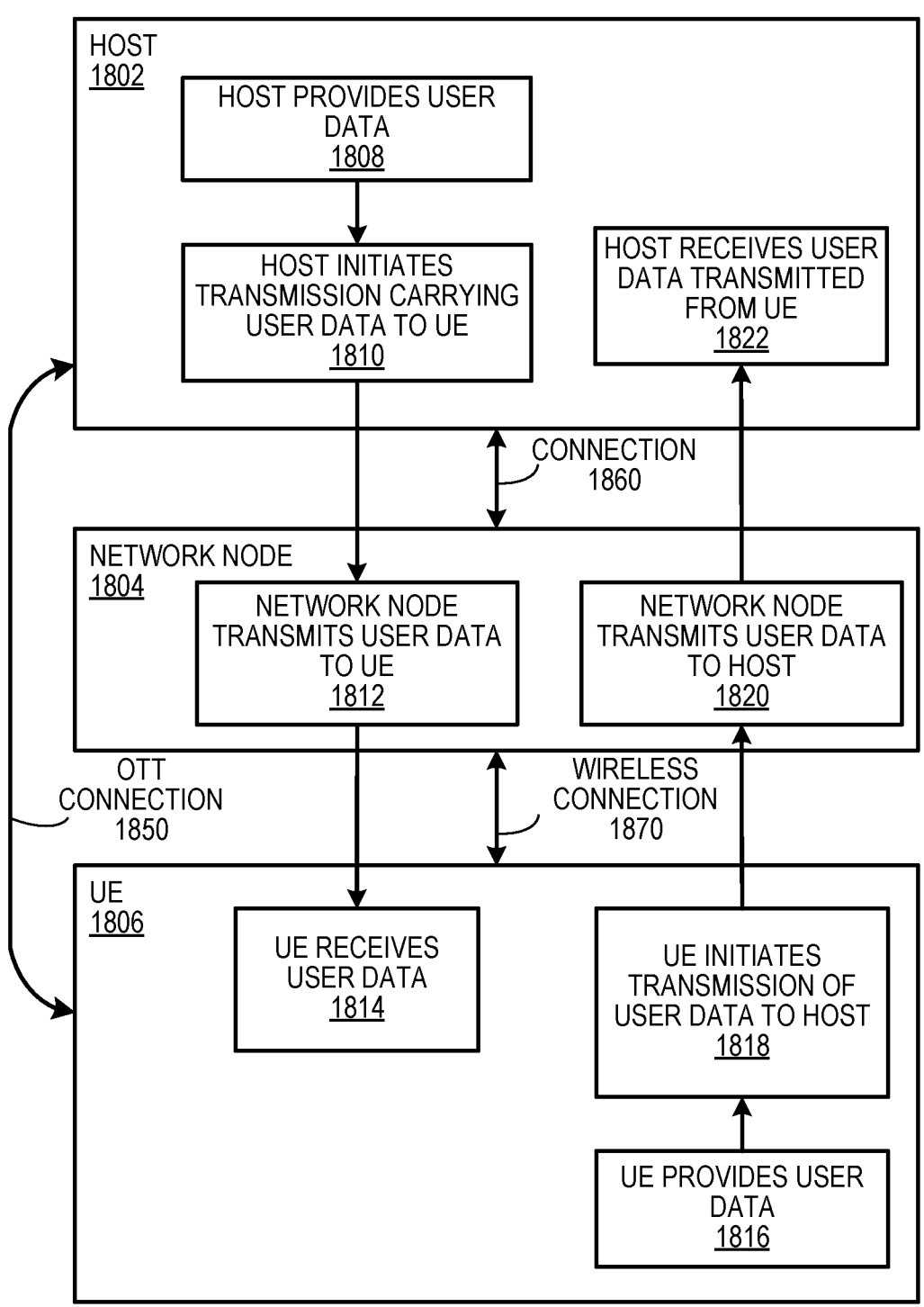
FIG. 18 illustrates communication between a host computing system, a network node, and a UE via multiple connections, at least one of which is wireless, according to various embodiments of the present disclosure.

FIG. 18 shows a communication diagram of a host 1802 communicating via a network node 1804 with a UE 1806 over a partially wireless connection in accordance with some embodiments. Example implementations, in accordance with various embodiments, of the UE (such as a UE 1312a of FIG. 13 and/or UE 1400 of FIG. 14), network node (such as network node 1310a of FIG. 13 and/or network node 1500 of FIG. 15), and host (such as host 1316 of FIG. 13 and/or host 1600 of FIG. 16) discussed in the preceding paragraphs will now be described with reference to FIG. 18.

Like host 1600, embodiments of host 1802 include hardware, such as a communication interface, processing circuitry, and memory. The host 1802 also includes software, which is stored in or accessible by the host 1802 and executable by the processing circuitry. The software includes a host application that may be operable to provide a service to a remote user, such as the UE 1806 connecting via an over-the-top (OTT) connection 1850 extending between the UE 1806 and host 1802. In providing the service to the remote user, a host application may provide user data which is transmitted using the OTT connection 1850.

The network node 1804 includes hardware enabling it to communicate with the host 1802 and UE 1806. The connection 1860 may be direct or pass through a core network (like core network 1306 of FIG. 13) and/or one or more other intermediate networks, such as one or more public, private, or hosted networks. For example, an intermediate network may be a backbone network or the Internet.

The UE 1806 includes hardware and software, which is stored in or accessible by UE 1806 and executable by the UE's processing circuitry. The software includes a client application, such as a web browser or operator-specific "app" that may be operable to provide a service to a human or non-human user via UE 1806 with the support of the host 1802. In the host 1802, an executing host application may communicate with the executing client application via the OTT connection 1850 terminating at the UE 1806 and host 1802. In providing the service to the user, the UE's client application may receive request data from the host's host application and provide user data in response to the request data. The OTT connection 1850 may transfer both the request data and the user data. The UE's client application may interact with the user to generate the user data that it provides to the host application through the OTT connection 1850.

The OTT connection 1850 may extend via a connection 1860 between the host 1802 and 20) the network node 1804 and via a wireless connection 1870 between the network node 1804 and the UE 1806 to provide the connection between the host 1802 and the UE 1806. The connection 1860 and wireless connection 1870, over which the OTT connection 1850 may be provided, have been drawn abstractly to illustrate the communication between the host 1802 and the UE 1806 via the network node 1804, without explicit reference to any intermediary devices and the precise routing of messages via these devices.

As an example of transmitting data via the OTT connection 1850, in step 1808, the host 1802 provides user data, which may be performed by executing a host application. In some embodiments, the user data is associated with a particular human user interacting with the UE 1806. In other embodiments, the user data is associated with a UE 1806 that shares data with the host 1802 without explicit human interaction. In step 1810, the host 1802 initiates a transmission carrying the user data towards the UE 1806. The host 1802 may initiate the transmission responsive to a request transmitted by the UE 1806. The request may be caused by human interaction with the UE 1806 or by operation of the client application executing on the UE 1806. The transmission may pass via the network node 1804, in accordance with the teachings of the embodiments described throughout this disclosure. Accordingly, in step 1812, the network node 1804 transmits to the UE 1806 the user data that was carried in the transmission that the host 1802 initiated, in accordance with the teachings of the embodiments described throughout this disclosure. In step 1814, the UE 1806 receives the user data carried in the transmission, which may be performed by a client application executed on the UE 1806 associated with the host application executed by the host 1802.

In some examples, the UE 1806 executes a client application which provides user data to the host 1802. The user data may be provided in reaction or response to the data received from the host 1802. Accordingly, in step 1816, the UE 1806 may provide user data, which may be performed by executing the client application. In providing the user data, the client application may further consider user input received from the user via an input/output interface of the UE 1806. Regardless of the specific manner in which the user data was provided, the UE 1806 initiates, in step 1818, transmission of the user data towards the host 1802 via the network node 1804. In step 1820, in accordance with the teachings of the embodiments described throughout this disclosure, the network node 1804 receives user data from the UE 1806 and initiates transmission of the received user data towards the host 1802. In step 1822, the host 1802 receives the user data carried in the transmission initiated by the UE 1806.

One or more of the various embodiments improve the performance of OTT services provided to the UE 1806 using the OTT connection 1850, in which the wireless connection 1870 forms the last segment. More precisely, these embodiments provide flexible and efficient techniques to for a second (or target) RAN node to be information of existing positioning measurements performed by a first (or source) RAN node before a UE enters RRC_INACTIVE state. This can save energy needed to perform such measurements and to configure the UE to support such measurements. This can also reduce positioning latency as well as network signaling traffic needed to configure the UE. Avoiding redundant measurements by the second RAN node can also reduce UE energy consumed in support of such redundant measurements (e.g., by reference signal transmission). In this manner, embodiments can improve the delivery of positioning-based OTT services by a wireless network (including the RAN), which increases the value of such services to end users and OTT service providers.

In an example scenario, factory status information may be collected and analyzed by the host 1802. As another example, the host 1802 may process audio and video data which may have been retrieved from a UE for use in creating maps. As another example, the host 1802 may collect and analyze real-time data to assist in controlling vehicle congestion (e.g., controlling traffic lights). As another example, the host 1802 may store surveillance video uploaded by a UE. As another example, the host 1802 may store or control access to media content such as video, audio, VR or AR which it can broadcast, multicast or unicast to UEs. As other examples, the host 1802 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1850 between the host 1802 and UE 1806, in response to variations in the measurement results. The measurement procedure and/or the network functionality for reconfiguring the OTT connection may be implemented in software and hardware of the host 1802 and/or UE 1806. In some embodiments, sensors (not shown) may be deployed in or in association with other devices through which the OTT connection 1850 passes; the sensors may participate in the measurement procedure by supplying values of the monitored quantities exemplified above, or supplying values of other physical quantities from which software may compute or estimate the monitored quantities. The reconfiguring of the OTT connection 1850 may include message format, retransmission settings, preferred routing etc.; the reconfiguring need not directly alter the operation of the network node 1804. Such procedures and functionalities may be known and practiced in the art. In certain embodiments, measurements may involve proprietary UE signaling that facilitates measurements of throughput, propagation times, latency and the like, by the host 20) 1802. The measurements may be implemented in that software causes messages to be transmitted, in particular empty or 'dummy' messages, using the OTT connection 1850 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

Embodiments of the techniques and apparatus described herein also include, but are not limited to, the following enumerated examples:

A1. A method for a user equipment (UE) configured for positioning in a radio access network (RAN), the method comprising:

initiating a positioning procedure while connected to the RAN via a first RAN node;

before completing the positioning procedure, suspending the connection to RAN an inactive state;

sending, to a second RAN node, a request to resume the connection to the RAN, wherein the request includes one or more of the following:

a first indication that UE had an ongoing positioning procedure with the first RAN node before the connection was suspended, and a second indication that the UE has reported positioning measurements to the first RAN node before the connection was suspended; and continuing the positioning procedure while connected to the RAN via the second RAN node.

A2. The method of embodiment A1, wherein initiating the positioning procedure comprises:

receiving, from the first RAN node, a first configuration for uplink (UL) positioning signals; and transmitting UL positioning signals according to the first configuration.

A3. The method of any of embodiments A1-A2, wherein continuing the positioning procedure comprises:

receiving, from the second RAN node, a second configuration for uplink (UL) positioning signals; and transmitting UL positioning signals according to the second configuration.

A4. The method of embodiment A3, wherein the second configuration includes one or more of the following configuration elements that differ from corresponding configuration elements of the first configuration:

beam directions;

spatial relations between beams;

transmission periodicity;

transmission timing advance (TA);

transmission power;

reference signal (RS) resource sets; and resources per RS resource set.

A5. The method of any of embodiments A1-A4, wherein the positioning procedure is an uplink time difference of arrival (UL-TDOA) procedure.

B1. A method for a first radio access network (RAN) node to support positioning of user equipment (UEs) in the RAN, the method comprising:

initiating a positioning procedure for the UE while the UE is connected to the RAN via the first RAN node;

before completing the positioning procedure, receiving, from a second RAN node, a retrieve UE context request that includes a third indication of a request for positioning measurements associated with the UE; and sending, to the second RAN node, a response that includes positioning measurements made by the first RAN node during the positioning procedure.

B2. The method of embodiment B1, wherein initiating the positioning procedure comprises:

sending, to the UE, a first configuration for uplink (UL) positioning signals; and measuring UL positioning signals transmitted by the UE according to the first configuration.

B3. The method of any of embodiments B1-B2, wherein the response is one of the following:

a retrieve UE context response message that includes the UE context;

a retrieve UE context failure message; or a message other than the retrieve UE context response message or the retrieve UE context failure message.

B4. The method of any of embodiments B1-B3, wherein the response also includes a first configuration for uplink (UL) positioning signals transmitted by the UE in relation to the positioning measurements.

B5. The method of embodiment B4, wherein the positioning measurements include one or more of the following:

receive-transmit (RxTx) time difference at the first RAN node; and one or more of the following measured by the first RAN node on the positioning signals transmitted by the UE according to the first configuration: reference signal received power (RSRP), angle of arrival (AoA), and relative time of arrival (RTOA).

B6. The method of any of embodiments B1-B5, wherein the positioning measurements include positioning measurements made by multiple transmission reception points (TRPs) associated with the first RAN node.

B7. The method of any of embodiments B1-B6, wherein the positioning procedure is an uplink time difference of arrival (UL-TDOA) procedure.

C1. A method for a second radio access network (RAN) node to support positioning of user equipment (UEs) in the RAN, the method comprising:

receiving, from a UE, a request to resume a suspended connection to the RAN, wherein the request includes one or more of the following:

a first indication that UE had an ongoing positioning procedure with a first RAN node before the connection was suspended, and a second indication that the UE reported positioning measurements to the first RAN node before the connection was suspended; and retrieving, from the first RAN node, positioning measurements made by the first RAN node during the positioning procedure; and continuing the positioning procedure for the UE while the UE is connected to the RAN via the second RAN node.

C2. The method of embodiment C1, wherein retrieving the positioning measurements comprises:

sending, to the first RAN node, a retrieve UE context request that includes a third indication of a request for positioning measurements associated with the UE;

receiving, from the first RAN node, a response that includes the positioning measurements made by the first RAN node during the positioning procedure.

C3. The method of embodiment C2, wherein the third indication is based on at least one of the first and second indications.

C4. The method of any of embodiments C2-C3, wherein the response is one of the following:

a retrieve UE context response message that includes the UE context;

a retrieve UE context failure message; or a message other than the retrieve UE context response message or the retrieve UE context failure message.

C5. The method of any of embodiments C2-C4, wherein the response also includes a first configuration for uplink (UL) positioning signals transmitted by the UE in relation to the positioning measurements.

C6. The method of any of embodiments C1-C5, wherein the retrieved positioning measurements include one or more of the following:

receive-transmit (RxTx) time difference at the first RAN node; and one or more of the following measured by the first RAN node on the positioning signals transmitted by the UE: reference signal received power (RSRP), angle of arrival (AoA), and relative time of arrival (RTOA).

C7. The method of any of embodiments C1-C6, wherein continuing the positioning procedure comprises:

determining a second configuration for uplink (UL) positioning signals based on the retrieved positioning measurements;

sending the second configuration to the UE; and measuring UL positioning signals transmitted by the UE according to the second configuration.

C8. The method of embodiment C7, wherein determining the second configuration is further based on a first configuration for uplink (UL) positioning signals transmitted by the UE, that is retrieved in association with the positioning measurements.

C9. The method of embodiment C8, wherein the second configuration includes one or more of the following configuration elements that differ from corresponding configuration elements of the first configuration:

beam directions;

spatial relations between beams;

transmission periodicity;

transmission timing advance (TA);

transmission power;

reference signal (RS) resource sets;

resources per RS resource set.

C10. The method of any of embodiments C1-C9, wherein the retrieved positioning measurements include positioning measurements made by multiple transmission reception points (TRPs) associated with the first RAN node.

C11. The method of any of embodiments C1-C10, wherein the positioning procedure is an uplink time difference of arrival (UL-TDOA) procedure.

D1. A user equipment (UE) configured for positioning in a radio access network (RAN), the UE comprising:

communication interface circuitry configured to communicate with one or more RAN nodes; and processing circuitry operatively coupled to the radio transceiver circuitry, whereby the processing circuitry and the radio transceiver circuitry are configured to perform operations corresponding to any of the methods of embodiments A1-A5.

D2. A user equipment (UE) configured for positioning in a radio access network (RAN), the UE being further configured to perform operations corresponding to any of the methods of embodiments A1-A5.

D3. A non-transitory, computer-readable medium storing computer-executable instructions that, when executed by processing circuitry of a user equipment (UE) configured for positioning in a radio access network (RAN), configure the UE to perform operations corresponding to any of the methods of embodiments A1-A5.

D4. A computer program product comprising computer-executable instructions that, when executed by processing circuitry of a user equipment (UE) configured for positioning in a radio access network (RAN), configure the UE to perform operations corresponding to any of the methods of embodiments A1-A5.

E1. A first radio access network (RAN) node configured to support positioning of user equipment (UEs) in the RAN, the first RAN node comprising:

communication interface circuitry configured to communicate with user equipment (UEs) and with a second RAN node; and processing circuitry operatively coupled to the communication interface circuitry, whereby the processing circuitry and the communication interface circuitry are configured to perform operations corresponding to any of the methods of embodiments B1-B7.

E2. A first radio access network (RAN) node configured to support positioning of user equipment (UEs) in the RAN, the first RAN node being further configured to perform operations corresponding to any of the methods of embodiments B1-B7.

E3. A non-transitory, computer-readable medium storing computer-executable instructions that, when executed by processing circuitry of a first radio access network (RAN) node configured to support positioning of user equipment (UEs) in the RAN, configure the first RAN node to perform operations corresponding to any of the methods of embodiments B1-B7.

E4. A computer program product comprising computer-executable instructions that, when executed by processing circuitry of a first radio access network (RAN) node configured to support positioning of user equipment (UEs) in the RAN, configure the first RAN node to perform operations corresponding to any of the methods of embodiments B1-B7.

F1. A second radio access network (RAN) node configured to support positioning of user equipment (UEs) in the RAN, the second RAN node comprising:

communication interface circuitry configured to communicate with user equipment (UEs) and with a first RAN node; and processing circuitry operatively coupled to the communication interface circuitry, whereby the processing circuitry and the communication interface circuitry are configured to perform operations corresponding to any of the methods of embodiments C1-C11.

F2. A second radio access network (RAN) node configured to support positioning of user equipment (UEs) in the RAN, the second RAN node being further configured to perform operations corresponding to any of the methods of embodiments C1-C11.

F3. A non-transitory, computer-readable medium storing computer-executable instructions that, when executed by processing circuitry of a second radio access network (RAN) node configured to support positioning of user equipment (UEs) in the RAN, configure the second RAN node to perform operations corresponding to any of the methods of embodiments C1-C11.

F4. A computer program product comprising computer-executable instructions that, when executed by processing circuitry of a second radio access network (RAN) node configured to support positioning of user equipment (UEs) in the RAN, configure the second RAN node to perform operations corresponding to any of the methods of embodiments C1-C11.

The invention claimed is:

1. A method for a second radio access network (RAN) node configured to support positioning of user equipment (UEs) in the RAN, the method comprising:

receiving, from a UE, a request to resume the UE's connection to the RAN that is currently suspended, wherein the request includes one or more of the following:

a first indication that UE had an ongoing positioning procedure with a first RAN node before the UE's connection to the RAN was suspended, and a second indication that the UE reported positioning measurements to the first RAN node before the UE's connection to the RAN was suspended; and retrieving, from the first RAN node, positioning measurements made by the first RAN node during the positioning procedure; and continuing the positioning procedure for the UE while the UE is connected to the RAN via the second RAN node.

2. The method of claim 1, wherein retrieving the positioning measurements comprises:

sending, to the first RAN node, a retrieve UE context request that includes a third indication of a request for positioning measurements associated with the UE; and receiving, from the first RAN node, a response that includes the positioning measurements made by the first RAN node during the positioning procedure.

3. The method of claim 2, wherein the third indication is based on at least one of the first and second indications.

4. The method of claim 2, wherein the response also includes a first configuration for uplink (UL) positioning signals transmitted by the UE in relation to the positioning measurements.

5. The method of claim 1, wherein the retrieved positioning measurements include one or more of the following:

receive-transmit time difference at the first RAN node; and one or more of the following measured by the first RAN node on the positioning signals transmitted by the UE: reference signal received power, angle of arrival, and relative time of arrival.

6. The method of claim 1, wherein continuing the positioning procedure comprises:

determining a second configuration for uplink (UL) positioning signals based on the retrieved positioning measurements;

sending the second configuration to the UE; and measuring UL positioning signals transmitted by the UE according to the second configuration.

7. The method of claim 6, wherein:

determining the second configuration is further based on a first configuration for UL positioning signals transmitted by the UE in relation to the retrieved positioning measurements; and the first configuration is retrieved from the first RAN node in association with the positioning measurements.

8. The method of claim 7, wherein the second configuration includes one or more of the following configuration elements that differ from corresponding configuration elements of the first configuration:

beam directions;

spatial relations between beams;

transmission periodicity;

transmission timing advance;

transmission power;

reference signal (RS) resource sets;

resources per RS resource set.

9. A method for a user equipment (UE) configured for positioning in a radio access network (RAN), the method comprising:

initiating a positioning procedure while the UE is connected to the RAN via a first RAN node;

before completing the positioning procedure, suspending the UE's connection to the RAN to an inactive state;

sending, to a second RAN node, a request to resume the UE's connection to the RAN, wherein the request includes one or more of the following:

a first indication that UE had an ongoing positioning procedure with the first RAN node before the UE's connection to the RAN was suspended, and a second indication that the UE reported positioning measurements to the first RAN node before the UE's connection to the RAN was suspended; and continuing the positioning procedure while the UE is connected to the RAN via the second RAN node.

10. The method of claim 9, wherein initiating the positioning procedure comprises:

receiving, from the first RAN node, a first configuration for uplink (UL) positioning signals to be transmitted by the UE; and transmitting UL positioning signals according to the first configuration.

11. The method of claim 9, wherein continuing the positioning procedure comprises:

receiving, from the second RAN node, a second configuration for uplink (UL) positioning signals to be transmitted by the UE; and transmitting UL positioning signals according to the second configuration, wherein the second configuration includes one or more of the following configuration elements that differ from corresponding configuration elements of the first configuration:

beam directions;

spatial relations between beams;

transmission periodicity;

transmission timing advance;

transmission power;

reference signal (RS) resource sets; and resources per RS resource set.

12. A method for a first radio access network (RAN) node configured to support positioning of user equipment (UEs) in the RAN, the method comprising:

initiating a positioning procedure for a UE connected to the RAN via the first RAN node;

before completing the positioning procedure, receiving from a second RAN node a retrieve UE context request that includes a third indication of a request for positioning measurements associated with the UE, wherein the UE suspended its connection to the RAN via the first RAN node and resumed its connection to the RAN via the second RAN node; and sending, to the second RAN node, a response that includes positioning measurements made by the first RAN node during the positioning procedure for the UE.

13. The method of claim 12, wherein initiating the positioning procedure comprises:

sending, to the UE, a first configuration for uplink (UL) positioning signals to be transmitted by the UE; and measuring UL positioning signals transmitted by the UE according to the first configuration.

14. The method of claim 12, wherein the response is one of the following:

a retrieve UE context response message that includes the UE context;

a retrieve UE context failure message; or a message other than the retrieve UE context response message or the retrieve UE context failure message.

15. The method of claim 12, wherein the response sent to the second RAN node also includes a first configuration for uplink (UL) positioning signals transmitted by the UE in relation to the positioning measurements.

16. The method of claim 15, wherein the positioning measurements include one or more of the following:

receive-transmit time difference at the first RAN node; and one or more of the following measured by the first RAN node on the positioning signals transmitted by the UE: reference signal received power, angle of arrival, and relative time of arrival.

17. The method of claim 16, wherein one or more of the following applies:

the positioning measurements include positioning measurements made by multiple transmission reception points (TRPs) associated with the first RAN node; and the positioning procedure is an uplink time difference of arrival (UL-TDOA) procedure.

18. A second radio access network (RAN) node configured to support positioning of user equipment (UEs) in the RAN, the second RAN node comprising:

communication interface circuitry configured to communicate with user equipment, UEs and with a first RAN node; and processing circuitry operatively coupled to the communication interface circuitry, whereby the processing circuitry and the communication interface circuitry are configured to perform the method of claim 1.

19. A user equipment (UE) configured for positioning in a radio access network, RAN, the UE comprising:

communication interface circuitry configured to communicate with one or more RAN nodes; and processing circuitry operatively coupled to the communication interface circuitry, whereby the processing circuitry and the communication interface circuitry are configured to perform the method of claim 9.

20. A first radio access network (RAN) node configured to support positioning of user equipment (UEs) in the RAN, the first RAN node comprising:

communication interface circuitry configured to communicate with user equipment, UEs and with a second RAN node; and processing circuitry operatively coupled to the communication interface circuitry, whereby the processing circuitry and the communication interface circuitry are configured to perform the method of claim 12.

* * * * *